(12) United States Patent
Hirano et al.

(10) Patent No.: US 12,443,008 B2
(45) Date of Patent: Oct. 14, 2025

(54) PROJECTION SYSTEM AND PROJECTOR

(71) Applicant: SEIKO EPSON CORPORATION, Tokyo (JP)

(72) Inventors: Hitoshi Hirano, Suwa (JP); Hirotaka Yanagisawa, Azumino (JP); Akihisa Kageyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 229 days.

(21) Appl. No.: 18/191,958

(22) Filed: Mar. 29, 2023

(65) Prior Publication Data

US 2023/0314764 A1   Oct. 5, 2023

(30) Foreign Application Priority Data

Mar. 30, 2022   (JP) .................. 2022-054797

(51) Int. Cl.
| | | |
|---|---|---|
| *G02B 13/22* | (2006.01) | |
| *G02B 9/06* | (2006.01) | |
| *G02B 13/00* | (2006.01) | |
| *G02B 13/16* | (2006.01) | |
| *G03B 21/14* | (2006.01) | |

(52) U.S. Cl.
CPC .............. *G02B 9/06* (2013.01); *G02B 13/16* (2013.01)

(58) Field of Classification Search
CPC .... G02B 13/22; G02B 13/16; G02B 13/0045; G02B 9/64; G02B 9/06; G02B 9/08; G02B 9/10; G02B 13/006
USPC .......................... 359/663, 649, 650, 651, 794
See application file for complete search history.

(56) References Cited

U.S. PATENT DOCUMENTS

| | | | | |
|---|---|---|---|---|
| 7,280,285 | B2* | 10/2007 | Nagahara .............. | G02B 13/16 359/651 |
| 7,289,270 | B2* | 10/2007 | Yamamoto ..... | G02B 15/143507 359/649 |
| 7,423,819 | B1* | 9/2008 | Chuang .................. | G02B 13/18 359/716 |
| 2010/0123955 | A1* | 5/2010 | Kawana ................. | G02B 13/04 359/649 |
| 2017/0285310 | A1* | 10/2017 | Cheng .................. | G02B 13/004 |
| 2019/0278055 | A1* | 9/2019 | Lin .......................... | G02B 9/62 |

FOREIGN PATENT DOCUMENTS

JP             2008-309991 A           12/2008

\* cited by examiner

*Primary Examiner* — Ricky L Mack
*Assistant Examiner* — Elizabeth M Hall
(74) *Attorney, Agent, or Firm* — Oliff PLC

(57) ABSTRACT

A projection system includes a first lens group, an aperture diaphragm, and a second lens group. A reduction side of the second lens group is telecentric. The first lens group includes a first sub-lens group having negative power and a second sub-lens group having positive power. Between a lens located at the most reduction side of the first sub-lens group and a lens located at the most enlargement side of the second sub-lens group, an air gap wider than air gaps between the other lenses adjacent to each other is provided. A lens located at the most reduction side in the first lens group is a positive lens. A cemented lens of the second lens group includes a first lens having negative power, a second lens having positive power, and a third lens having negative power from an enlargement side toward a reduction side. ω>40.

7 Claims, 16 Drawing Sheets

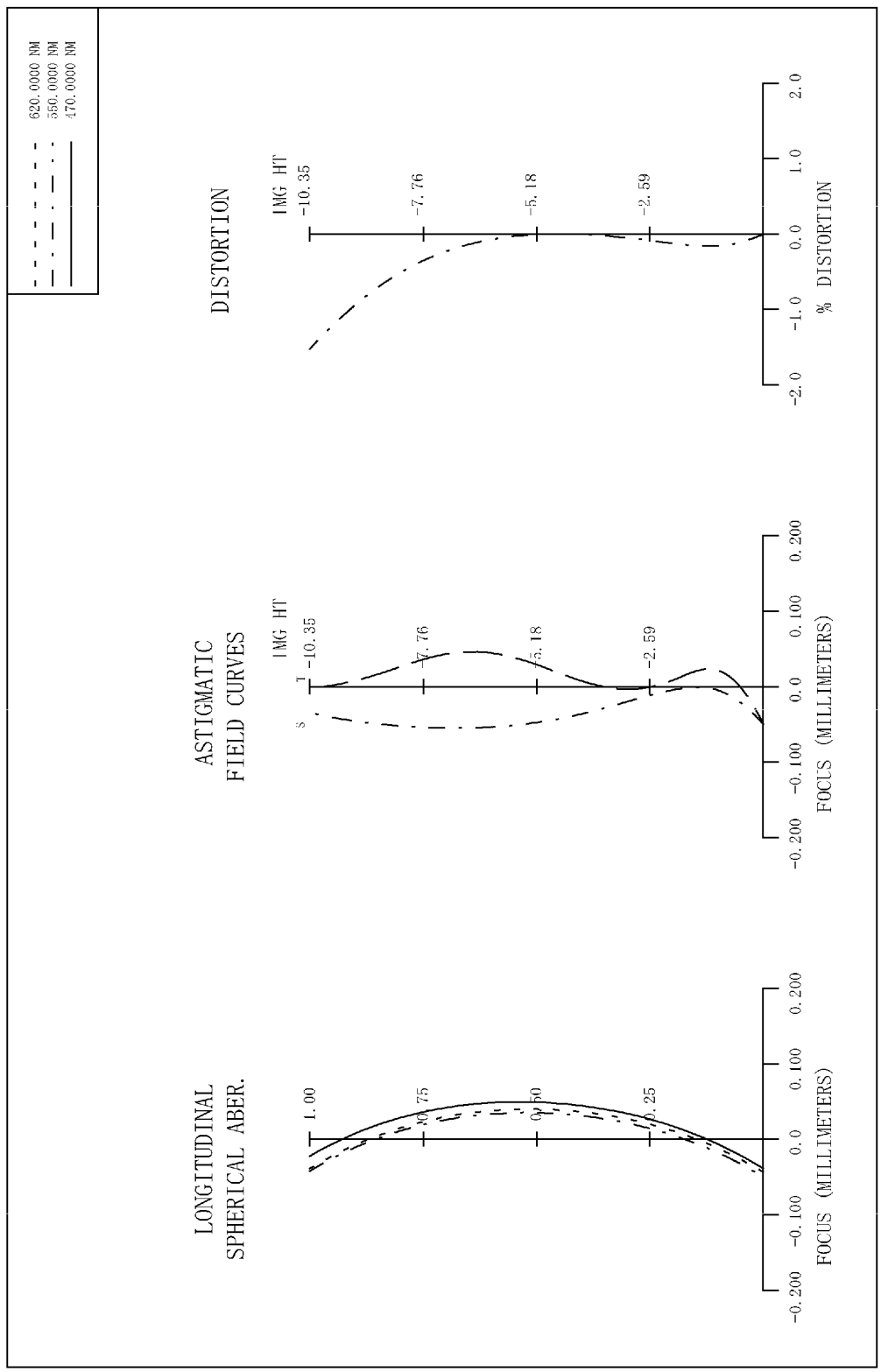

PROJECTION SYSTEM AND PROJECTOR

The present application is based on, and claims priority from JP Application Serial Number 2022-054797, filed Mar. 30, 2022, the disclosure of which is hereby incorporated by reference herein in its entirety.

BACKGROUND

1. Technical Field

The present disclosure relates to a projection system and a projector.

2. Related Art

JP-A-2008-309991 discloses a projector including a projection system that can perform wide angle projection at a half angle of view larger than 40°. The projection system of JP-A-2008-309991 includes a first lens group having negative power and a second lens group having positive power from an enlargement side toward a reduction side. The first lens group includes a first lens of an aspheric lens, a second lens, a third lens of a negative meniscus lens with a concave surface toward the reduction side, and a first cemented lens sequentially from the enlargement side toward the reduction side. The first cemented lens includes a fourth lens of a negative lens with a concave surface toward the reduction side, a fifth lens of a biconvex lens, and a sixth lens of a negative lens with a concave surface toward the enlargement side from the enlargement side toward the reduction side.

The second lens group includes a seventh lens of a positive lens, an aperture diaphragm, an eighth lens of a negative lens, a second cemented lens, a 12th lens of an aspheric lens, a third cemented lens, and a 16th lens of a biconvex lens from the enlargement side toward the reduction side. The second cemented lens includes a ninth lens of a positive lens, a 10th lens of a biconcave lens, and an 11th lens of a positive lens from the enlargement side toward the reduction side. The third cemented lens includes a 13th lens of a positive lens, a 14th lens of a biconcave lens, and a 15th lens of a positive lens.

In the projection system of JP-A-2008-309991, the seventh lens is located adjacent to the aperture diaphragm at the enlargement side. Further, the air gap between the seventh lens and the sixth lens is wider than the air gaps between the other lenses adjacent to each other.

The projection system of JP-A-2008-309991 has the widest air gap between the seventh lens and the sixth lens. The seventh lens is the positive lens and located adjacent to the aperture diaphragm at the enlargement side. Therefore, in the projection system, the positive power of the seventh lens is made lower, and thereby, the luminous flux output from the seventh lens and reaching the sixth lens may be made wider. Therefore, in the projection system, a beam from the seventh lens is enlarged with respect to each image height by the first lens to the sixth lens located at the enlargement side thereof and projected easily. However, as in JP-A-2008-309991, in the projection system having the widest air gap at the enlargement side of the positive lens located adjacent to the aperture diaphragm at the enlargement side, chromatic aberration tends to occur in the positive lens.

SUMMARY

In order to solve the above described problem, a projection system according to an aspect of the present disclosure includes a first lens group having refractive power, an aperture diaphragm, and a second lens group having refractive power sequentially from an enlargement side toward a reduction side, wherein a reduction side of the second lens group is telecentric, the first lens group includes a first sub-lens group having negative power and a second sub-lens group having positive power sequentially from the enlargement side toward the reduction side, between a lens located at the most reduction side of the first sub-lens group and a lens located at the most enlargement side of the second sub-lens group, an air gap wider than air gaps between the other lenses adjacent to each other is provided, a lens located at the most reduction side in the first lens group is a positive lens, the second lens group includes a cemented lens, the cemented lens includes a first lens having negative power, a second lens having positive power, and a third lens having negative power sequentially from the enlargement side toward the reduction side, and $\omega > 40$ where a maximum half angle of view of an entire lens system is $\omega$.

A projector according to an aspect of the present disclosure includes the above described projection system and an image forming device forming a projection image on a conjugate plane at a reduction side of the projection system.

BRIEF DESCRIPTION OF THE DRAWINGS

FIG. 16 shows longitudinal aberration, astigmatism, distortion of Example 7.

DESCRIPTION OF EXEMPLARY EMBODIMENTS

As below, an optical system and a projector according to an embodiment of the present disclosure will be explained with reference to the drawings.

Projector

Figure 1:
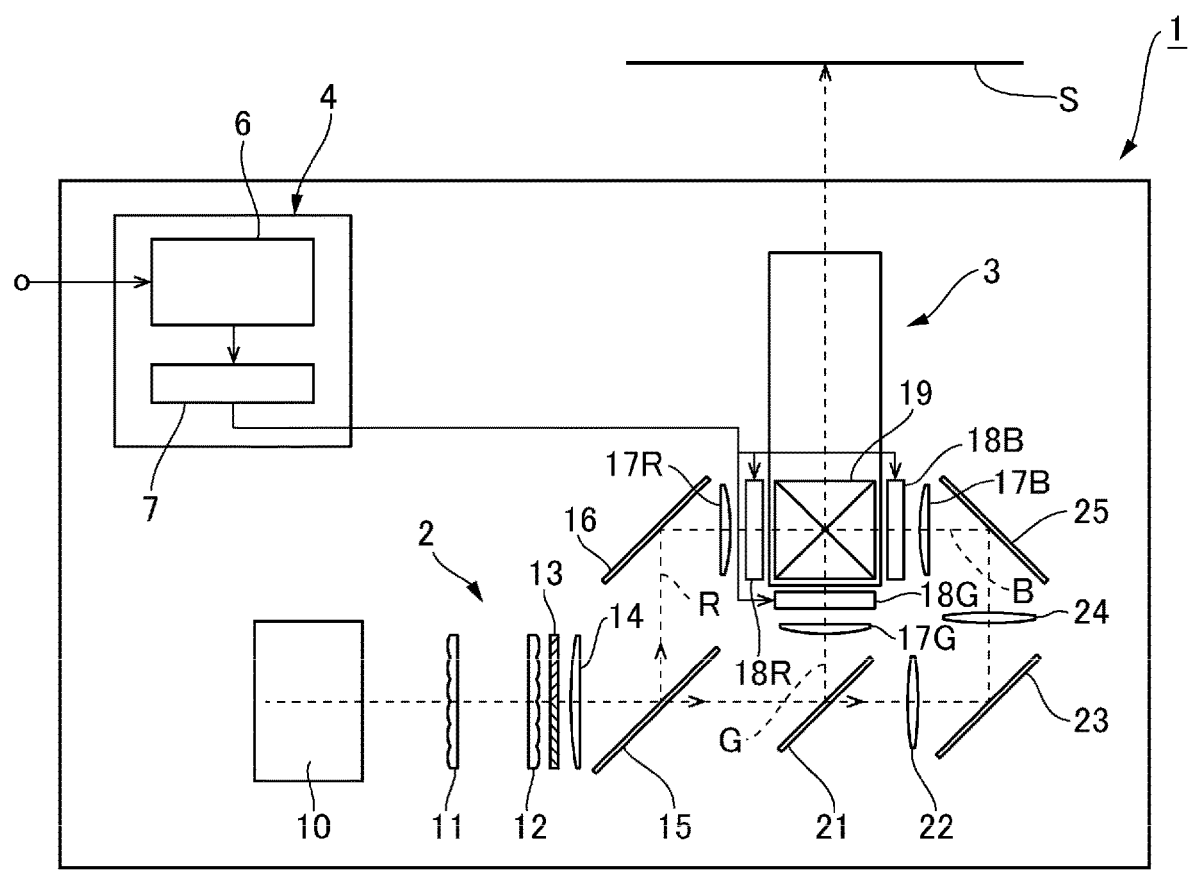
FIG. 1 shows a schematic configuration of a projector including a projection system of the present disclosure.

FIG. 1 shows a schematic configuration of a projector including a projection system 3 of the present disclosure. As shown in FIG. 1, a projector 1 includes an image formation section 2 generating a projection image to be projected on a screen S, the projection system 3 enlarging the projection image and projecting an enlarged image on the screen S, and a control section 4 controlling operation of the image formation section 2.

Image Formation Section and Control Section

The image formation section 2 includes a light source 10, a first integrator lens 11, a second integrator lens 12, a polarization conversion element 13, and a superimposing lens 14. The light source 10 includes e.g., a super high-pressure mercury lamp, a solid-state light source, or the like. Each of the first integrator lens 11 and the second integrator lens 12 has a plurality of lens elements arranged in an array form. The first integrator lens 11 divides a luminous flux from the light source 10 into a plurality pieces. The respective lens elements of the first integrator lens 11 focus the luminous flux from the light source 10 on vicinities of the respective lens elements of the second integrator lens 12.

The polarization conversion element 13 converts the light from the second integrator lens 12 into predetermined linearly-polarized light. The superimposing lens 14 superimposes images of the respective lens elements of the first integrator lens 11 on display areas of a liquid crystal panel 18R, a liquid crystal panel 18G, and a liquid crystal panel 18B, which will be described later, via the second integrator lens 12.

Further, the image formation section 2 includes a first dichroic mirror 15, a reflection mirror 16, a field lens 17R, and the liquid crystal panel 18R. The first dichroic mirror 15 reflects an R light as a part of the beam entering from the superimposing lens 14 and transmits a G light and a B light as parts of the beam entering from the superimposing lens 14. The R light reflected by the first dichroic mirror 15 enters the liquid crystal panel 18R via the reflection mirror 16 and the field lens 17R. The liquid crystal panel 18R is an image forming device. The liquid crystal panel 18R modulates the R light according to an image signal and forms a red projection image.

Furthermore, the image formation section 2 includes a second dichroic mirror 21, a field lens 17G, and the liquid crystal panel 18G. The second dichroic mirror 21 reflects the G light as a part of the beam from the first dichroic mirror 15 and transmits the B light as a part of the beam from the first dichroic mirror 15. The G light reflected by the second dichroic mirror 21 enters the liquid crystal panel 18G via the field lens 17G. The liquid crystal panel 18G is an image forming device. The liquid crystal panel 18G modulates the G light according to an image signal and forms a green projection image.

Moreover, the image formation section 2 includes a relay lens 22, a reflection mirror 23, a relay lens 24, a reflection mirror 25, a field lens 17B, the liquid crystal panel 18B, and a cross dichroic prism 19. The B light transmitted through the second dichroic mirror 21 enters the liquid crystal panel 18B via the relay lens 22, the reflection mirror 23, the relay lens 24, the reflection mirror 25, and the field lens 17B. The liquid crystal panel 18B is an image forming device. The liquid crystal panel 18B modulates the B light according to an image signal and forms a blue projection image.

The liquid crystal panel 18R, the liquid crystal panel 18G, and the liquid crystal panel 18B surround the cross dichroic prism 19 from three directions. The cross dichroic prism 19 is a prism for combining lights and generates a projection image by combining the lights modulated by the respective liquid crystal panels 18R, 18G, 18B.

The projection system 3 enlarges and projects the projection image combined by the cross dichroic prism 19 on the screen S.

The control section 4 includes an image processing unit 6 to which an external image signal such as a video signal is input and a display drive unit 7 driving the liquid crystal panel 18R, the liquid crystal panel 18G, and the liquid crystal panel 18B based on the image signals output from the image processing unit 6.

The image processing unit 6 converts image signals input from an external apparatus into image signals containing tones of the respective colors etc. The display drive unit 7 operates the liquid crystal panel 18R, the liquid crystal panel 18G, and the liquid crystal panel 18B based on the projection image signals of the respective colors output from the image processing unit 6. Thereby, the image processing unit 6 displays the projection images corresponding to the image signals on the liquid crystal panel 18R, the liquid crystal panel 18G, and the liquid crystal panel 18B.

Projection System

Figure 2:
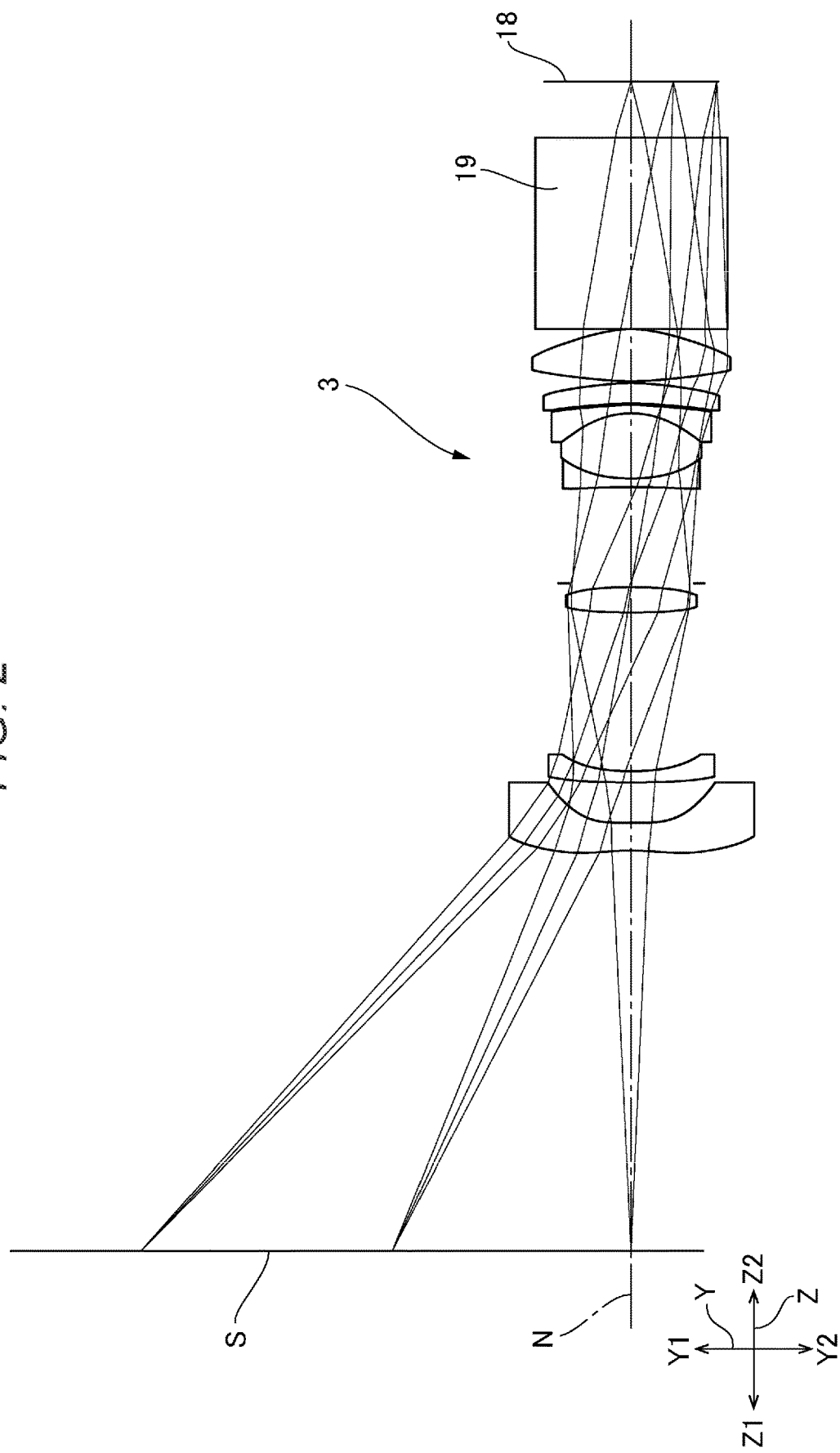
FIG. 2 is a ray diagram of the projection system.

Next, the projection system 3 is explained. FIG. 2 is a ray diagram of the projection system 3. Note that, in FIG. 2, the liquid crystal panel 18R, the liquid crystal panel 18G, and the liquid crystal panel 18B are shown as "liquid crystal panel 18". As shown in FIG. 2, the screen S is placed on an enlargement-side conjugate plane of the projection system 3. The liquid crystal panel 18 is placed on a reduction-side conjugate plane of the projection system 3.

Here, in the following description, for convenience, three axes orthogonal to one another are an X-axis, a Y-axis, and a Z-axis. Further, the directions along an optical axis N of the projection system 3 are Z-axis directions. In the Z-axis directions, a side at which the screen S is located is a first direction Z1 and a side at which the liquid crystal panel 18 is located is a second direction Z2. The Y-axis extends along the screen S. The Y-axis directions are upward and downward directions and one side is an upside Y1 and the other side is a downside Y2. The X-axis extends in the width directions of the screen.

As shown in FIG. 2, the liquid crystal panel 18 placed on the reduction-side conjugate plane forms a projection image at the downside Y2 with respect to the optical axis N of the projection system 3. An enlarged image projected on the screen S by the projection system 3 is formed at the upside Y1 with respect to the optical axis N.

As below, Examples 1 to 7 will be explained as configuration examples of the projection system 3 provided in the projector 1.

Example 1

Figure 3:
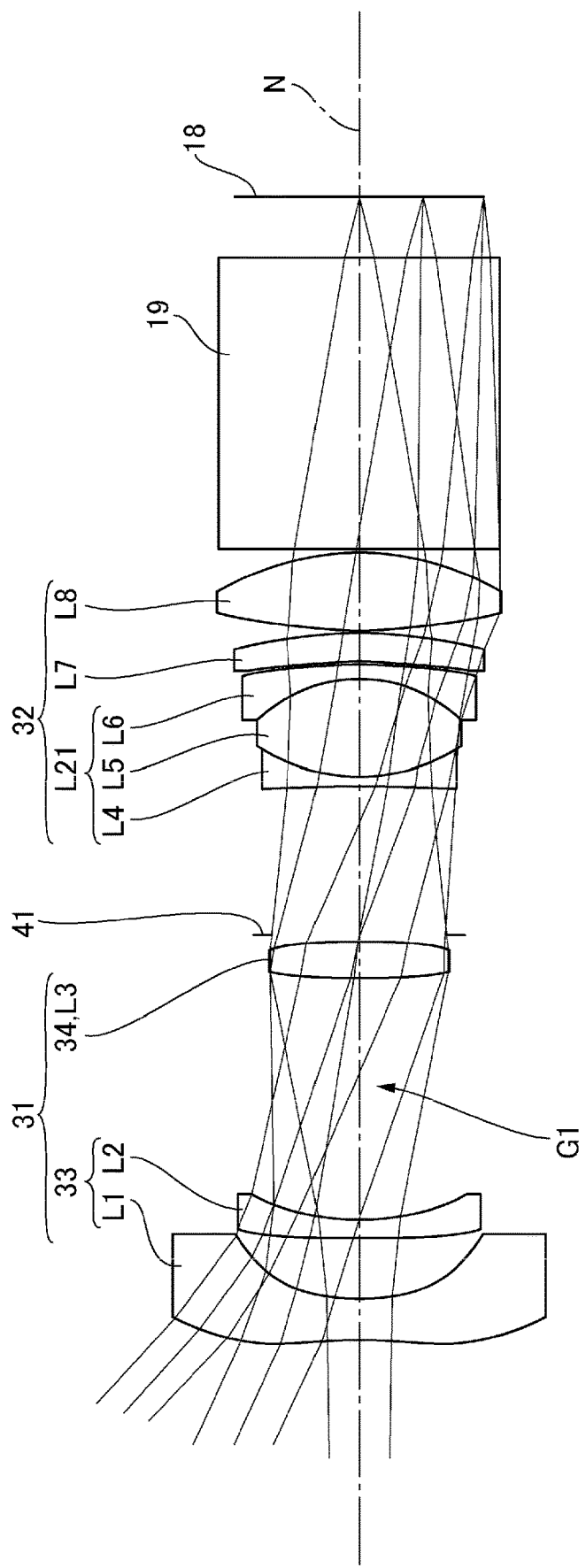
FIG. 3 is a ray diagram of a projection system of Example 1.

FIG. 3 is a ray diagram of a projection system 3A of Example 1. As shown in FIG. 3, the projection system 3A includes a first lens group 31 having positive power, an aperture diaphragm 41, and a second lens group 32 having positive power sequentially from an enlargement side toward a reduction side. The aperture diaphragm 41 is set for defining brightness of the projection system 3A.

The first lens group 31 includes a first sub-lens group 33 having negative power and a second sub-lens group 34 having positive power sequentially from the enlargement side toward the reduction side.

The first sub-lens group 33 includes two lenses L1 and L2. The lens L1 and the lens L2 are placed sequentially from the enlargement side toward the reduction side.

The lens L1 (enlargement-side lens) has negative power. The lens L1 has a concave shape near the optical axis N and a convex shape in the peripheral portion in the surface at the enlargement side. The lens L1 has a convex shape near the optical axis N and a concave shape in the peripheral portion in the surface at the reduction side. The lens L1 has aspheric shapes in both surfaces. The lens L2 has negative power. The lens L2 is a meniscus lens. The lens L2 has a convex shape in the surface at the enlargement side and a concave shape in the surface at the reduction side.

The second sub-lens group 34 includes a single lens L3. The lens L3 has positive power. The lens L3 has convex shapes in the surfaces at the enlargement side and the reduction side.

The second lens group 32 includes five lenses L4 to L8. The lens L4 to lens L8 are sequentially placed from the enlargement side toward the reduction side.

The lens L4 (first lens), the lens L5 (second lens), and the lens L6 (third lens) form a cemented lens L21. The lens L4 has negative power. The lens L4 has concave shapes in the surfaces at the enlargement side and the reduction side. The lens L5 has positive power. The lens L5 has convex shapes in the surfaces at the enlargement side and the reduction side. The lens L6 has negative power. The lens L6 is a meniscus lens. The lens L6 has a concave shape in the surface at the enlargement side and a convex shape in the surface at the reduction side. The cemented lens L21 has negative power.

The lens L7 has positive power. The lens L7 is a meniscus lens. The lens L7 has a concave shape in the surface at the enlargement side and a convex shape in the surface at the reduction side.

The lens L8 (reduction-side lens) has positive power. The lens L8 has convex shapes in the surfaces at the enlargement side and the reduction side. The lens L8 has aspheric shapes in both surfaces.

The lens L1 is made of resin. The lens L2 to lens L8 are made of glass.

In the projection system 3A, the reduction side of the lens L8 is telecentric. Being telecentric from the reduction side is that the center beams of the respective luminous fluxes passing between the lens L8 and the liquid crystal panel 18 placed on the conjugate plane at the reduction side are parallel to the optical axis N or substantially parallel to the optical axis N.

Between the lens L2 located at the most reduction side of the first sub-lens group 33A and the lens L3 located at the most enlargement side of the second sub-lens group 34, a first air gap G1 wider than air gaps between the other lenses adjacent to each other is provided.

When the F-number of the projection system 3A is FNo, the total track length is TTL, the distance on the optical axis N from the surface at the enlargement side of the lens L1 to the surface at the reduction side of the lens L8 is L, the back focus is BF, the maximum half angle of view of the entire lens system is ω, the distance from the optical axis N to the maximum image height of the projection image formed by the liquid crystal panel 18 is YIM, the focal length of the entire lens system is F, the power of the entire lens system is P, the focal length of the lens L1 is Fls, the focal length of the lens L8 is Flf, the power of the lens L4 in the air is Pc1, the Abbe's number of the lens L4 is Vc1, the power of the lens L5 in the air is Pc2, the Abbe's number of the lens L5 is Vc2, the power of the lens L6 in the air is Pc3, the Abbe's number of the lens L6 is Vc3, and the focal length of the lens L3 is Flp, data of the projection system 3A of Example 1 is as below. Note that the power of the lens in the air refers to power of the lens alone before cemented as the cemented lens.

| | |
|---|---|
| Fno | 2.011 |
| TTL | 94.125 mm |
| L | 65.000 mm |
| BF | 29.125 mm |
| ω | 43.478° |
| YIM | 10.350 mm |
| F | 11.061 mm |
| P | 0.090 |
| Fls | −25.729 mm |
| Flf | 25.805 mm |
| Pc1 | −0.042 |
| Vc1 | 39.242 |
| Pc2 | 0.067 |
| Vc2 | 81.546 |
| Pc3 | −0.046 |
| Vc3 | 27.512 |
| Flp | 26.855 mm |

Lens data of the projection system 3A is as below. The surface numbers are sequentially assigned from the enlargement side toward the reduction side. The signs are signs of the screen, the lens, the aperture diaphragm, the dichroic prism, and the liquid crystal panel. The surface with * attached to the surface number is an aspheric surface. R is a radius of curvature. D is an axial surface distance. nd is a refractive index of d ray. vd is an Abbe's number of d ray. The units of R, d are mm.

| Sign | Surface number | R | D | nd | vd |
|---|---|---|---|---|---|
| S | 0 | inf | 1063.000 | | |
| L01 | 1* | −24.60 | 3.412 | 1.5365 | 56.0 |
| | 2* | 33.26 | 4.940 | | |
| L02 | 3 | 62.59 | 1.500 | 1.4875 | 70.2 |
| | 4 | 18.74 | 19.922 | | |
| L03 | 5 | 42.22 | 3.090 | 1.8340 | 37.2 |
| | 6 | −46.68 | 0.500 | | |
| 41 | 7 | inf | 12.190 | | |
| L04 | 8 | −307.14 | 1.000 | 1.5955 | 39.2 |
| L05 | 9 | 15.05 | 8.000 | 1.4970 | 81.5 |
| L06 | 10 | −12.26 | 1.200 | 1.7552 | 27.5 |
| | 11 | −49.05 | 0.200 | | |
| L07 | 12 | −59.52 | 2.385 | 1.4875 | 70.2 |
| | 13 | −39.24 | 0.200 | | |
| L08 | 14* | 40.24 | 6.461 | 1.5365 | 56.0 |
| | 15* | −20.04 | 0.200 | | |
| 19 | 16 | inf | 23.925 | 1.5168 | 64.2 |
| | 17 | inf | 5.003 | | |
| 18 | 18 | inf | −0.003 | | |

The respective aspheric factors are as below.

| | Surface number | |
|---|---|---|
| | 1 | 2 |
| Conic constant | 1.09448E+00 | −1.00000E+02 |
| Third-order factor | −8.78634E−04 | −1.20376E−03 |
| Fourth-order factor | 1.00159E−03 | 1.70343E−03 |
| Fifth-order factor | −1.05886E−04 | −2.43171E−04 |
| Sixth-order factor | 3.06988E−06 | 1.62609E−05 |
| Seventh-order factor | 1.55509E−07 | 2.28363E−07 |
| Eighth-order factor | −3.86698E−09 | −7.88741E−08 |
| Ninth-order factor | −4.95579E−10 | −2.09364E−09 |
| 10th-order factor | −6.53534E−12 | 2.87495E−10 |
| 11th-order factor | 5.54636E−13 | 2.78596E−11 |
| 12th-order factor | 6.91541E−14 | 1.83829E−12 |
| 13th-order factor | 4.16933E−15 | −1.77922E−13 |
| 14th-order factor | −1.51364E−16 | −2.96733E−14 |
| 15th-order factor | −1.32836E−17 | −2.32779E−16 |
| 16th-order factor | −5.29770E−19 | 6.11188E−17 |
| 17th-order factor | 8.92389E−21 | 2.46593E−17 |
| 18th-order factor | −1.68839E−21 | −5.88329E−19 |

-continued

| | | |
|---|---|---|
| 19th-order factor | 4.58578E−22 | −1.39215E−19 |
| 20th-order factor | −1.46956E−23 | 6.13128E−21 |

| | Surface number | |
|---|---|---|
| | 14 | 15 |
| Conic constant | 0.00000E+00 | 0.00000E+00 |
| Fourth-order factor | −2.18999E−05 | 2.39426E−05 |
| Sixth-order factor | 7.03290E−08 | 2.26359E−08 |
| Eighth-order factor | −1.49424E−10 | 7.38394E−11 |
| 10th-order factor | −4.06354E−13 | −7.55428E−13 |

[0058]

Here, the projection system 3A of the example satisfies the following conditional expression (1) when the maximum half angle of view of the entire lens system is ω.

$$\omega > 40 \quad (1)$$

In the example,
ω 43.478°

Therefore, ω=43.478° and satisfies the conditional expression (1).

The projection system 3A of the example satisfies all of the following conditional expressions (2), (3), (4), and (5) when the total length from the lens surface at the enlargement side of the lens L1 to the lens surface at the reduction side of the lens L8 is L, the focal length of the entire lens system is F, the air conversion length of the back focus is BF, the focal length of the lens L1 is Fls, and the focal length of the lens L8 is Flf.

$$5.0 < L/F < 30.0 \quad (2)$$

$$BF/F > 2.0 \quad (3)$$

$$-20.0 < Fls/F < -2.0 \quad (4)$$

$$1.6 < Flf/F < 30.0 \quad (5)$$

In this example,

| | |
|---|---|
| L | 65.000 mm |
| F | 11.061 mm |
| BF | 29.125 mm |
| Fls | −25.729 mm |
| Flf | 25.805 mm |

Therefore, L/F=5.876 and satisfies the conditional expression (2). BF/F=2.633 and satisfies the conditional expression (3). Fls/F=−2.326 and satisfies the conditional expression (4). Flf/F=2.333 and satisfies the conditional expression (5).

The projection system 3A of the example satisfies the following conditional expression (6) when the power of the entire lens system is P, the power of the lens L4 in the air is Pc1, the Abbe's number of the lens L4 is Vc1, the power of the lens L5 in the air is Pc2, the Abbe's number of the lens L5 is Vc2, the power of the lens L6 in the air is Pc3, and the Abbe's number of the lens L6 is Vc3.

$$-0.05 < (Pc1/P)/Vc1 + (Pc2/P)/Vc2 + (Pc3/P)/Vc3 < 0.01 \quad (6)$$

In the example,

| | |
|---|---|
| P | 0.090 |
| Pc1 | −0.042 |
| Vc1 | 39.242 |
| Pc2 | 0.067 |
| Vc2 | 81.546 |
| Pc3 | −0.046 |
| Vc3 | 27.512 |

Therefore, (Pc1/P)/Vc1+(Pc2/P)/Vc2+(Pc3/P)/Vc3=−0.021 and satisfies the conditional expression (6).

The projection system 3A of the example satisfies the following conditional expressions (7) and (8) when the focal length of the entire lens system is F, the focal length of the lens L3 is Flp, and the Abbe's number of the lens L3 in d ray is vdp.

$$vdp < 40 \quad (7)$$

$$1.5 < Flp/F < 15.0 \quad (8)$$

In the example,

| | |
|---|---|
| vdp | 37.161 |
| F | 11.061 mm |
| Flp | 26.855 mm |

Therefore, vdp=37.161 and satisfies the conditional expression (7). Flp/F=2.428 and satisfies the conditional expression (8).

Functions and Effects

In the projection system of the example, the first lens group 31 has the widest air gap G1 between the first sub-lens group 33 having negative power and the second sub-lens group 34 having positive power. Therefore, in the projection system 3A, the positive power of the second sub-lens group 34 located at the enlargement side of the aperture diaphragm 41 is made lower and the luminous flux output from the lens located at the most enlargement side of the second sub-lens group 34 and reaching the lens located at the most reduction side of the first sub-lens group 33 may be expanded. Accordingly, in the projection system 3A, the beam output form the second sub-lens group 34 may be easily enlarged and projected with respect to each image height by the first sub-lens group 33 located at the enlargement side thereof. Thus, in the projection system 3A of the example, the half angle of view may be set to be larger than 40° to satisfy the conditional expression (1).

Here, when the projection system has the widest air gap G1 at the enlargement side of the second sub-lens group 34 having positive power, there is a problem that the chromatic aberration tends to be occur in the second sub-lens group 34. For the problem, in the example, the cemented lens L21 of the second lens group 32 includes a lens L4 having negative power, a lens L5 having positive power, and a lens L6 having negative power sequentially from the enlargement side toward the reduction side. According to the cemented lens L21 including the three lenses, compared to a case of a cemented lens having a positive lens, a negative lens, and a positive lens cemented sequentially from the enlargement side toward the reduction side, the chromatic aberration of magnification occurring in the second sub-lens group 34 may be suppressed more easily.

Further, when the cemented lens L21 including the lens L4 having negative power, the lens L5 having positive power, and the lens L6 having negative power sequentially from the enlargement side toward the reduction side is employed, compared to a projection system including a cemented lens having a positive lens, a negative lens, and a positive lens cemented sequentially from the enlargement side toward the reduction side, the total length is easily made compact.

In the projection system 3A of the example, the lens L1 located at the most enlargement side has negative power and the maximum half angle of view of the projection system 3A may be easily increased. Further, the lens L8 located at the most reduction side has positive power, and the reduction side of the second lens group 32 may be easily set to be telecentric.

In the example, the first lens group 31 has a plurality of negative lenses placed continuously from the most enlargement side toward the reduction side. In the example, the lens L1 and the lens L2 are negative lenses having negative power. Further, the lens L1 is a plastic aspheric lens. According to the configuration, the curvature of field occurring in the projection system 3A is easily suppressed.

The projection system 3A of the example satisfies all of the following conditional expressions (2), (3), (4), and (5) when the total length from the lens surface at the enlargement side of the lens L1 to the lens surface at the reduction side of the lens L8 is L, the focal length of the entire lens system is F, the air conversion length of the back focus is BF, the focal length of the lens L1 is Fls, and the focal length of the lens L8 is Flf.

$$5.0 < L/F < 30.0 \quad (2)$$

$$BF/F > 2.0 \quad (3)$$

$$-20.0 < Fls/F < -2.0 \quad (4)$$

$$1.6 < Flf/F < 30.0 \quad (5)$$

Further, the projection system 3A of the example satisfies the conditional expressions (2), and thereby, the total length of the projection system 3A may be downsized and the imaging performance of the projection system 3A may be secured. That is, when the value of the conditional expression (2) exceeds a lower limit value, the distance from the lens at the most enlargement side to the lens at the most reduction side is too short. Thereby, the total length of the projection system 3A may be downsized, however, the number of lenses necessary for securing the imaging performance of the projection system 3A is not obtained. When the value of the conditional expression (2) exceeds an upper limit value, the distance is too long. Thereby, the number of lenses necessary for securing the imaging performance of the projection system 3A is obtained, however, the total length of the projection system 3A is upsized.

The projection system 3A of the example satisfies the conditional expression (3), and thereby, the back focus is easily secured. That is, when the value of the conditional expression (3) exceeds a lower limit value, the back focus is too short and it is difficult to secure a space housing a color combining prism and a correcting plate of the liquid crystal panel placed at the reduction side of the second lens group 32. Further it is difficult to set the reduction side of the second lens group 32 to be telecentric.

The projection system 3A of the example satisfies the conditional expression (4), and thereby, the sufficient back focus may be secured and the imaging performance of the projection system 3A may be secured. That is, when the value of the conditional expression (4) exceeds a lower limit value, the focal length Fls of the lens L1 is too short. Thereby, the imaging performance of the projection system 3A may be secured, however, the power of the lens L1 is stronger and it is difficult to secure the sufficiently long back focus. When the value of the conditional expression (4) exceeds an upper limit value, the focal length Fls of the lens L1 is too long. Thereby, the power of the lens L1 is weaker and the sufficiently long back focus may be secured, however, the imaging performance of the projection system 3A is lower.

The projection system 3A of the example satisfies the conditional expression (5), and thereby, the reduction side of the second lens group 32 may be set to be telecentric and the imaging performance of the projection system 3A may be secured.

That is, when the value of the conditional expression (5) exceeds a lower limit value, the focal length Flf of the lens L8 is too long. Thereby, the imaging performance of the projection system 3A may be secured, however, the power of the lens L11 is stronger and it is difficult to set the reduction side of the second lens group 32 to be telecentric. When the value of the conditional expression (5) exceeds an upper limit value, the focal length Flf of the lens L8 is too long. Thereby, the power of the lens L8 is weaker and it is easy to set the reduction side of the second lens group 32 to be telecentric, however, the imaging performance of the projection system 3A is lower.

The projection system 3A of the example satisfies the following conditional expression (6) when the power of the entire lens system is P, the power of the lens L4 in the air is Pc1, the Abbe's number of the lens L4 is Vc1, the power of the lens L5 in the air is Pc2, the Abbe's number of the lens L5 is Vc2, the power of the lens L6 in the air is Pc3, and the Abbe's number of the lens L6 is Vc3.

$$-0.05 < (Pc1/P)/Vc1 + (Pc2/P)/Vc2 + (Pc3/P)/Vc3 < 0.01 \quad (6)$$

The projection system 3A of the example satisfies the conditional expression (6), and thereby, the chromatic aberration of magnification occurring in the second sub-lens group 34 may be successfully suppressed. That is, when the value of the conditional expression (6) exceeds a lower limit value, the suppression effect of the chromatic aberration of magnification by the cemented lens L21 is too strong and unsuitable. When the value of the conditional expression (6) exceeds a condition value, the suppression effect of the chromatic aberration of magnification by the cemented lens L21 is too weak and the chromatic aberration of magnification occurring in the second sub-lens group 34 may be unsuccessfully suppressed.

The projection system 3A of the example satisfies the following conditional expressions (7) and (8) when the focal length of the entire lens system is F, the focal length of the lens L3 is Flp, and the Abbe's number of the lens L3 in d ray is vdp.

$$vdp < 40 \quad (7)$$

$$1.5 < Flp/F < 15.0 \quad (8)$$

The projection system 3A of the example satisfies the conditional expression (7), and thereby, the chromatic aberration of magnification occurring in the lens L1 may be successfully corrected. That is, the lens L3 is the positive lens placed in the position closest to the aperture diaphragm 41 and made of a material having high dispersibility, and the lens L3 may cancel out the chromatic aberration of magnification occurring in the lens L1.

The projection system 3A of the example satisfies the conditional expression (8), and thereby, the chromatic aberration of magnification occurring in the lens L1 may be successfully corrected and various kinds of aberration occurring in the lens L3 may be suppressed. That is, when the value of the conditional expression (8) exceeds a lower limit value, the focal length Flp of the lens L3 is too short. Thereby, the power of the lens L3 is stronger and the chromatic aberration of magnification occurring in the lens L1 may be successfully corrected, however, various kinds of aberration tend to occur in the lens L3. When the value of the conditional expression (8) exceeds an upper limit value, the focal length Flp of the lens L3 is too long. Thereby, the power of the lens L3 is weaker and various kinds of aberration occurring in the lens L3 may be suppressed, however, the chromatic aberration of magnification occurring in the lens L1 may be unsuccessfully corrected.

Figure 4:
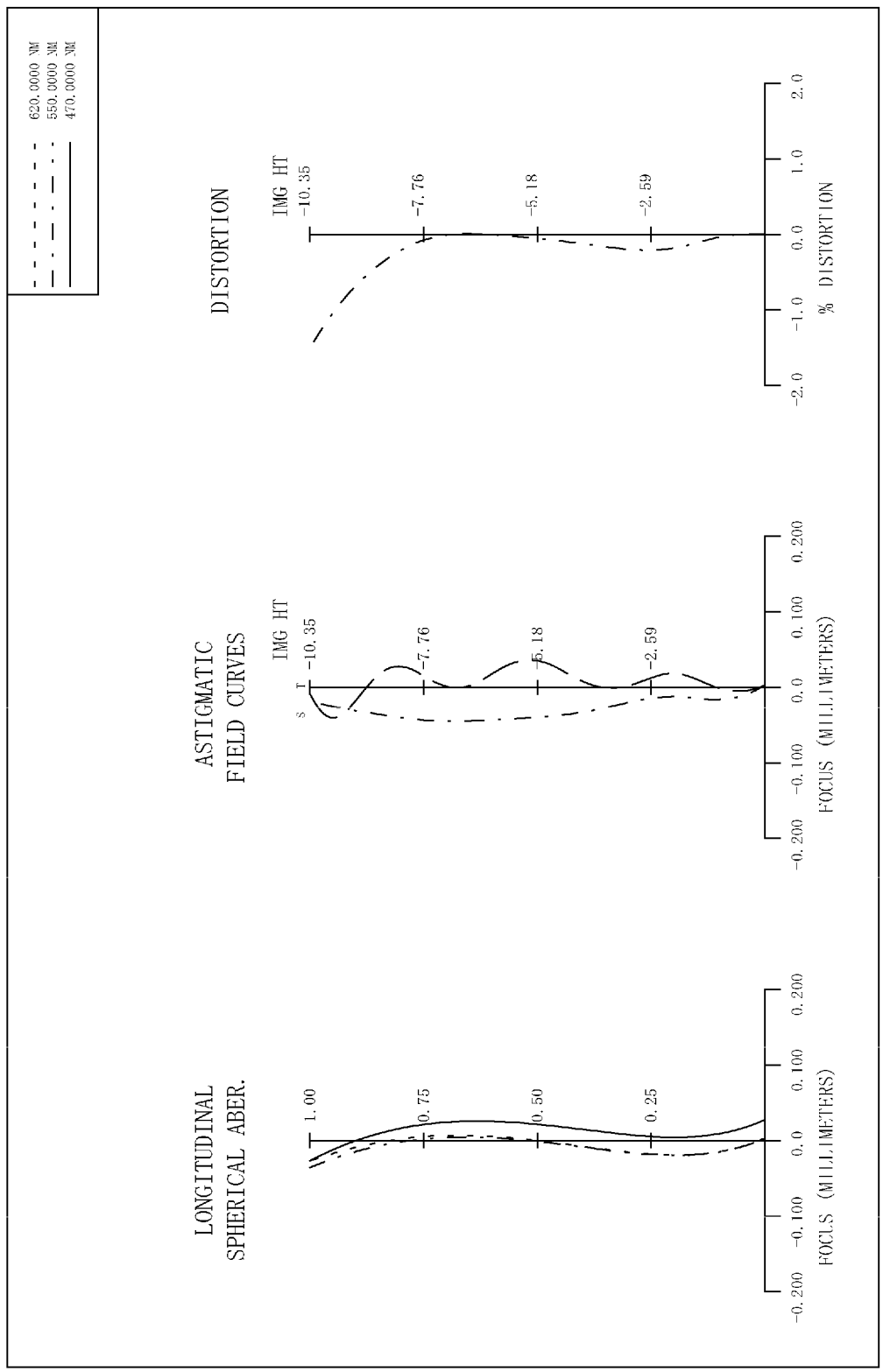
FIG. 4 shows longitudinal aberration, astigmatism, distortion of Example 1.

FIG. 4 shows spherical aberration, astigmatism, distortion of the projection system 3A. As shown in FIG. 4, in the projection system 3A of the example, various kinds of aberration in the enlarged image are suppressed.

Example 2

Figure 5:
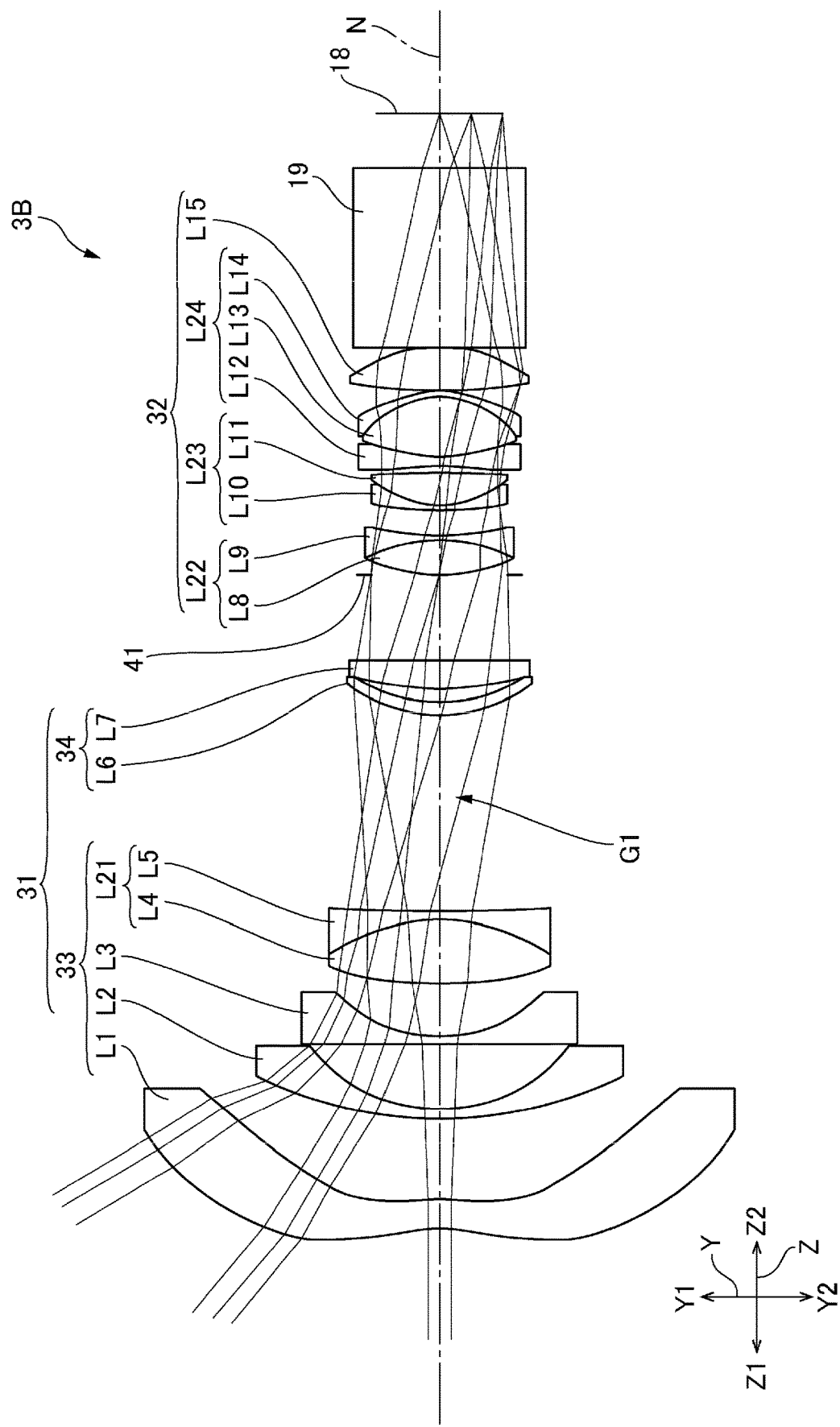
FIG. 5 is a ray diagram of a projection system of Example 2.

FIG. 5 is a ray diagram of a projection system 3B of Example 2. As shown in FIG. 5, the projection system 3B includes a first lens group 31 having positive power, an aperture diaphragm 41, and a second lens group 32 having positive power sequentially from an enlargement side toward a reduction side. The aperture diaphragm 41 is set for defining brightness of the projection system 3B.

The first lens group 31 includes a first sub-lens group 33 having negative power and a second sub-lens group 34 having positive power sequentially from the enlargement side toward the reduction side.

The first sub-lens group 33 includes five lenses L1 to L5. The lens L1 to lens L5 are placed sequentially from the enlargement side toward the reduction side.

The lens L1 (enlargement-side lens) has negative power. The lens L1 has a concave shape near the optical axis N and a convex shape in the peripheral portion in the surface at the enlargement side. The lens L1 has a convex shape near the optical axis N and has a concave shape in the peripheral portion in the surface at the reduction side. The lens L1 has aspheric shapes in both surfaces.

The lens L2 has negative power. The lens L2 is a meniscus lens. The lens L2 has a convex shape in the surface at the enlargement side and a concave shape in the surface at the reduction side. The lens L3 has negative power. The lens L3 is a meniscus lens. The lens L3 has a convex shape in the surface at the enlargement side and a concave shape in the surface at the reduction side.

The lens L4 and the lens L5 form a cemented lens L21. The lens L4 has positive power. The lens L4 has convex shapes in the surfaces at the enlargement side and the reduction side. The lens L5 has negative power. The lens L5 has concave shapes in the surfaces at the enlargement side and the reduction side. The cemented lens L21 has positive power.

The second sub-lens group 34 includes two lenses L6 and L7. The lens L6 and the lens L7 are sequentially placed from the enlargement side toward the reduction side. The lens L6 has positive power. The lens L6 is a meniscus lens. The lens L6 has a convex shape in the surface at the enlargement side and a concave shape in the surface at the reduction side. The lens L7 has positive power. The lens L7 has convex shapes in the surfaces at the enlargement side and the reduction side.

The second lens group 32 includes eight lenses L8 to L15. The lens L8 to lens L15 are sequentially placed from the enlargement side toward the reduction side.

The lens L8 and lens L9 form a cemented lens L22. The lens L8 has positive power. The lens L8 has convex shapes in the surfaces at the enlargement side and the reduction side. The lens L9 has negative power. The lens L9 has concave shapes in the surfaces at the enlargement side and the reduction side. The cemented lens L22 has positive power.

The lens L10 and the lens L11 form a cemented lens L23. The lens L10 has negative power. The lens L10 is a meniscus lens. The lens L10 has a convex shape in the surface at the enlargement side and a concave shape in the surface at the reduction side. The lens L11 has positive power. The lens L11 has convex shapes in the surfaces at the enlargement side and the reduction side. The lens L11 has an aspheric shape in the surface at the reduction side. The cemented lens L23 has positive power.

The lens L12 (first lens), the lens L13 (second lens), and the lens L14 (third lens) form a cemented lens L24. The lens L12 has negative power. The lens L12 has concave shapes in the surfaces at the enlargement side and the reduction side. The lens L13 has positive power. The lens L13 has convex shapes in the surfaces at the enlargement side and the reduction side. The lens L14 has negative power. The lens L14 is a meniscus lens. The lens L14 has a concave shape in the surface at the enlargement side and a convex shape in the surface at the reduction side. The cemented lens L24 has negative power.

The lens L15 (reduction-side lens) has positive power. The lens L15 has convex shapes in the surfaces at the enlargement side and the reduction side.

The lens L1 is made of resin and the lens L2 to lent L15 are made of glass.

In the projection system 3B, the reduction side of the lens L15 is telecentric.

Between the lens L5 located at the most reduction side of the first sub-lens group 33 and the lens L6 located at the most enlargement side of the second sub-lens group 34, a first air gap G1 wider than air gaps between the other lenses adjacent to each other is provided.

When the F-number of the projection system 3B is FNo, the total track length is TTL, the distance on the optical axis N from the surface at the enlargement side of the lens L1 to the surface at the reduction side of the lens L15 is L, the back focus is BF, the maximum half angle of view of the entire lens system is ω, the distance from the optical axis N to the maximum image height of the projection image formed by the liquid crystal panel 18 is YIM, the focal length of the entire lens system is F, the power of the entire lens system is P, the focal length of the lens L1 is Fls, the focal length of the lens L15 is Flf, the power of the lens L12 in the air is Pc1, the Abbe's number of the lens L12 is Vc1, the power of the lens L13 in the air is Pc2, the Abbe's number of the lens L13 is Vc2, the power of the lens L14 in the air is Pc3, the Abbe's number of the lens L14 is Vc3, and the focal length of the lens L7 is Flp, data of the projection system 3B of Example 2 is as below.

| | |
|---|---|
| Fno | 1.600 |
| TTL | 192.808 mm |
| L | 152.369 mm |
| BF | 40.439 mm |
| ω | 59.317° |
| YIM | 10.800 mm |
| F | 6.346 mm |
| P | 0.158 |
| Fls | −79.244 mm |
| Flf | 40.732 mm |

| | |
|---|---|
| Pc1 | −0.040 |
| Vc1 | 23.778 |
| Pc2 | 0.045 |
| Vc2 | 81.546 |
| Pc3 | −0.015 |
| Vc3 | 40.100 |
| Flp | 75.680 mm |

Lens data of the projection system 3B is as below. The surface numbers are sequentially assigned from the enlargement side toward the reduction side. The signs are signs of the screen, the lens, the aperture diaphragm, the dichroic prism, and the liquid crystal panel. The surface with * attached to the surface number is an aspheric surface. R is a radius of curvature. D is an axial surface distance. nd is a refractive index of d ray. vd is an Abbe's number of d ray. The units of R, d are mm.

| Sign | Surface number | R | D | nd | vd |
|---|---|---|---|---|---|
| S | 0 | inf | 937.000 | | |
| L01 | 1* | −21.34 | 5.000 | 1.5350 | 55.7 |
| | 2* | −46.30 | 13.962 | | |
| L02 | 3 | 70.52 | 1.500 | 1.6584 | 50.9 |
| | 4 | 28.09 | 11.279 | | |
| L03 | 5 | 2345.80 | 1.500 | 1.7620 | 40.1 |
| | 6 | 24.38 | 7.946 | | |
| L04 | 7 | 60.28 | 10.960 | 1.6976 | 29.0 |
| L05 | 8 | −33.80 | 1.500 | 1.9004 | 37.4 |
| | 9 | 196.49 | 35.002 | | |
| L06 | 10 | 25.13 | 2.194 | 1.5601 | 47.7 |
| | 11 | 25.80 | 2.262 | | |
| L07 | 12 | 48.30 | 5.135 | 1.6314 | 34.9 |
| | 13 | −9887.97 | 14.727 | | |
| 41 | 14 | inf | 0.100 | | |
| L08 | 15 | 27.53 | 6.004 | 1.7450 | 26.3 |
| L09 | 16 | −29.48 | 1.000 | 1.9004 | 37.4 |
| | 17 | 54.58 | 4.209 | | |
| L10 | 18 | 55.44 | 1.000 | 1.9019 | 35.6 |
| L11 | 19 | 17.54 | 5.50 | 1.5866 | 59.0 |
| | 20* | −82.39 | 1.00 | | |
| L12 | 21 | −83.49 | 1.72 | 1.8467 | 23.8 |
| L13 | 22 | 29.16 | 10.25 | 1.4970 | 81.5 |
| L14 | 23 | −16.02 | 1.00 | 1.7620 | 40.1 |
| | 24 | −24.29 | 0.15 | | |
| L15 | 25 | 94.19 | 7.47 | 1.4970 | 81.5 |
| | 26 | −25.19 | 0.10 | | |
| 19 | 27 | inf | 30.69 | 1.5168 | 64.2 |
| | 28 | inf | 9.69 | | |
| 18 | 29 | inf | −0.04 | | |

The respective aspheric factors are as below.

| | Surface number | |
|---|---|---|
| | 1 | 2 |
| Conic constant | −5.75343E+00 | 0.00000E+00 |
| Third-order factor | 6.65504E−04 | 7.71761E−04 |
| Fourth-order factor | −7.97236E−06 | 2.74106E−05 |
| Fifth-order factor | −1.00807E−07 | −1.06700E−06 |
| Sixth-order factor | 5.42611E−11 | −8.03394E−10 |
| Seventh-order factor | 3.29709E−11 | 1.10389E−10 |
| Eighth-order factor | 1.15849E−12 | 2.46074E−12 |
| Ninth-order factor | −5.27286E−15 | 4.82457E−14 |
| 10th-order factor | −1.50364E−16 | 4.56095E−16 |
| 11th-order factor | −7.86924E−18 | −1.43519E−17 |
| 12th-order factor | −1.24414E−19 | −5.35072E−19 |
| 13th-order factor | 2.49472E−21 | −1.27071E−20 |
| 14th-order factor | 7.60941E−23 | −1.95871E−22 |
| 15th-order factor | 3.85155E−25 | −7.86560E−25 |
| 16th-order factor | −8.06777E−27 | 8.98625E−26 |
| 17th-order factor | −2.19890E−28 | 4.49957E−27 |
| 18th-order factor | −4.42288E−30 | 9.94600E−29 |
| 19th-order factor | −2.02762E−32 | 4.35430E−31 |
| 20th-order factor | 1.71232E−33 | −6.83022E−32 |

| | 20 |
|---|---|
| Conic constant | −6.22053E+01 |
| Fourth-order factor | 8.51306E−06 |
| Sixth-order factor | 8.01125E−08 |
| Eighth-order factor | −3.70892E−10 |
| 10th-order factor | 1.01346E−12 |

Here, the projection system 3B of the example satisfies the following conditional expression (1) when the maximum half angle of view of the entire lens system is ω.

$$\omega > 40 \tag{1}$$

In the example,

ω 59.317°

Therefore, ω=59.317° and satisfies the conditional expression (1).

The projection system 3B of the example satisfies all of the following conditional expressions (2), (3), (4), and (5) when the total length from the lens surface at the enlargement side of the lens L1 to the lens surface at the reduction side of the lens L15 is L, the focal length of the entire lens system is F, the air conversion length of the back focus is BF, the focal length of the lens L1 is Fls, and the focal length of the lens L15 is Flf.

$$5.0 < L/F < 30.0 \tag{2}$$

$$BF/F > 2.0 \tag{3}$$

$$-20.0 < Fls/F < -2.0 \tag{4}$$

$$1.6 < Flf/F < 30.0 \tag{5}$$

In this example,

| | |
|---|---|
| L | 152.369 mm |
| F | 6.346 mm |
| BF | 40.439 mm |
| Fls | −79.244 mm |
| Flf | 40.732 mm |

Therefore, L/F=24.010 and satisfies the conditional expression (2). BF/F=6.372 and satisfies the conditional expression (3). Fls/F=−12.487 and satisfies the conditional expression (4). Flf/F=6.419 and satisfies the conditional expression (5).

The projection system 3B of the example satisfies the following conditional expression (6) when the power of the entire lens system is P, the power of the lens L12 in the air is Pc1, the Abbe's number of the lens L12 is Vc1, the power of the lens L13 in the air is Pc2, the Abbe's number of the lens L13 is Vc2, the power of the lens L14 in the air is Pc3, and the Abbe's number of the lens L14 is Vc3.

$$-0.05 < (Pc1/P)/Vc1 + (Pc2/P)/Vc2 + (Pc3/P)/Vc3 < 0.01 \tag{6}$$

In the example,

| | |
|---|---|
| P | 0.158 |
| Pc1 | −0.040 |
| Vc1 | 23.778 |

-continued

| | |
|---|---|
| Pc2 | 0.045 |
| Vc2 | 81.546 |
| Pc3 | −0.015 |
| Vc3 | 40.100 |

Therefore, (Pc1/P)/Vc1+(Pc2/P)/Vc2+(Pc3/P)/Vc3=−0.010 and satisfies the conditional expression (6).

The projection system 3B of the example satisfies the following conditional expressions (7) and (8) when the focal length of the entire lens system is F, the focal length of the lens L7 is Flp, and the Abbe's number of the lens L7 in d ray is vdp.

$$vdp<40 \quad (7)$$

$$1.5<Flp/F<15.0 \quad (8)$$

In the example,

| | |
|---|---|
| vdp | 34.852 |
| F | 6.346 mm |
| Flp | 75.680 mm |

Therefore, vdp=34.852 and satisfies the conditional expression (7). Flp/F=11.926 and satisfies the conditional expression (8).

Functions and Effects

The projection system 3B of the example satisfies the conditional expressions (1) to (8) and the same functions and effects as those of the projection system 3A of Example 1 may be obtained.

In the projection system 3B of the example, the lens L1 has negative power. Therefore, the maximum half angle of view of the projection system 3B is easily increased. In the example, the lens L15 has positive power. Therefore, the reduction side of the second lens group 32 is easily set to be telecentric.

In the example, the first lens group 31 has a plurality of negative lenses placed continuously from the most enlargement side toward the reduction side. In the example, the lens L1, the lens L2, and the lens L3 are negative lenses having negative power. Further, the lens L1 is a plastic aspheric lens. According to the configuration, the curvature of field occurring in the projection system 3B may be suppressed.

Figure 6:
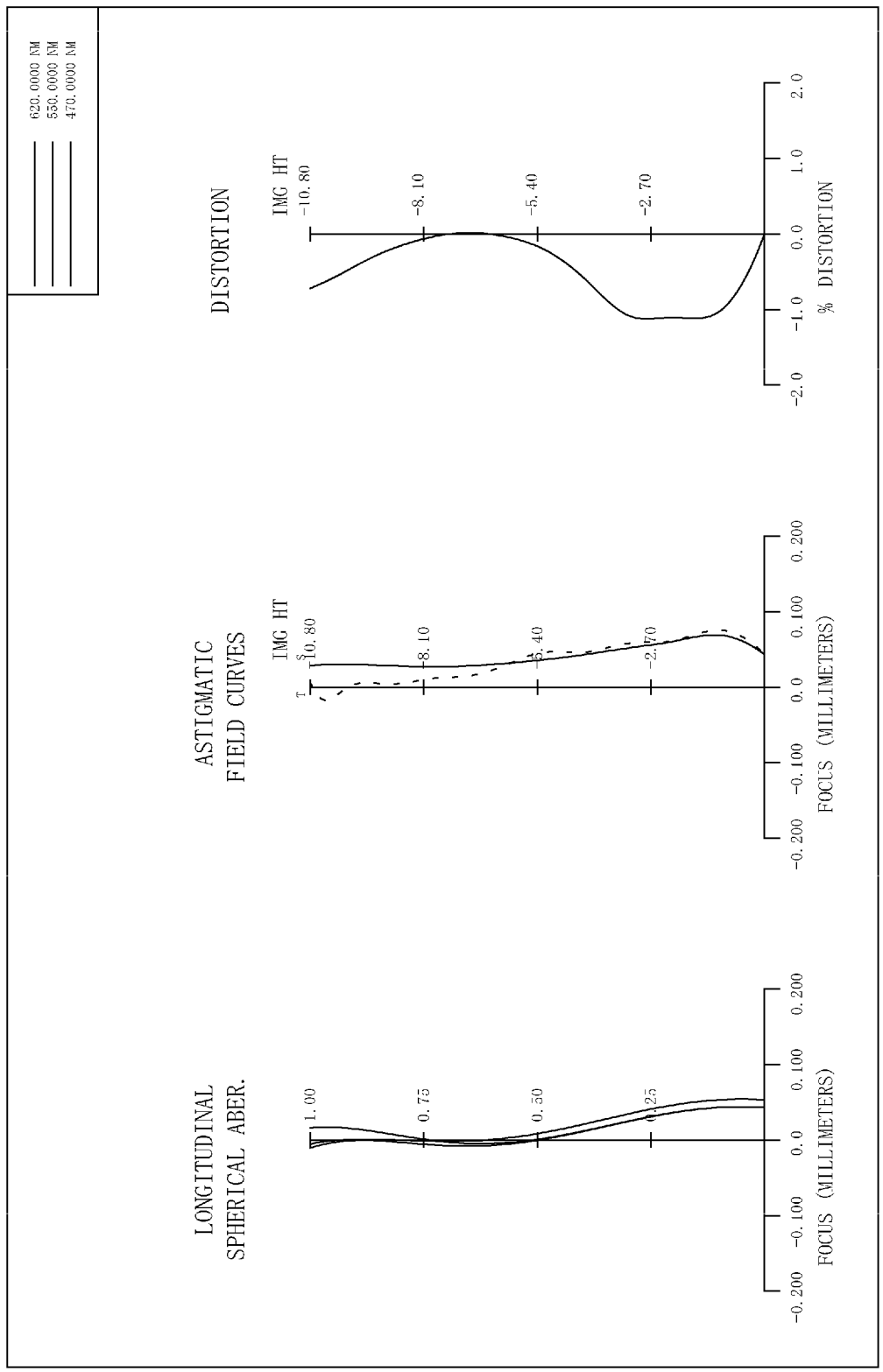
FIG. 6 shows longitudinal aberration, astigmatism, distortion of Example 2.

FIG. 6 shows spherical aberration, astigmatism, distortion of the projection system 3B. As shown in FIG. 6, in the projection system 3B of the example, various kinds of aberration in the enlarged image are suppressed.

Example 3

Figure 7:
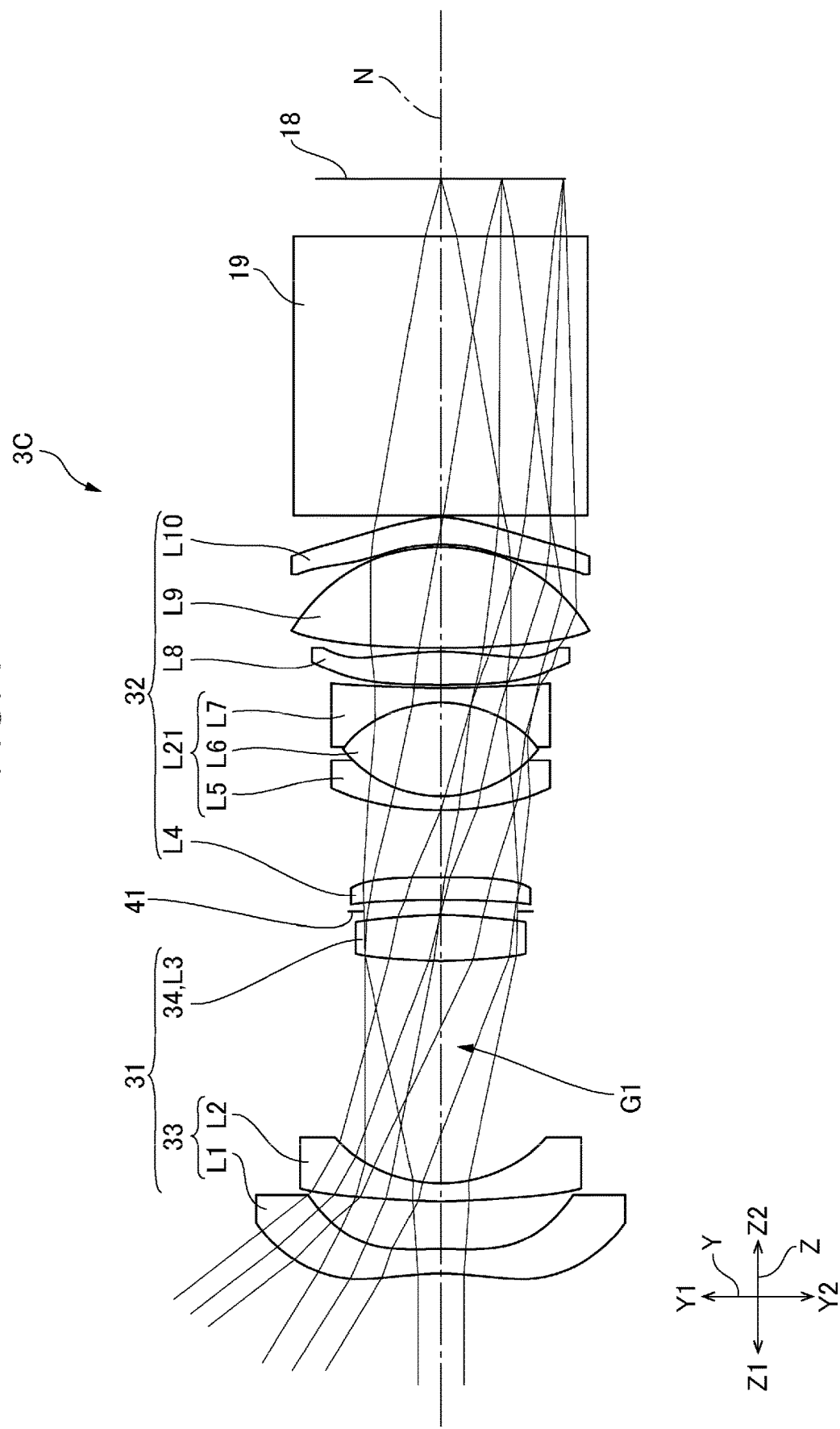
FIG. 7 is a ray diagram of a projection system of Example 3.

FIG. 7 is a ray diagram of a projection system 3C of Example 3. As shown in FIG. 7, the projection system 3C includes a first lens group 31 having positive power, an aperture diaphragm 41, and a second lens group 32 having positive power sequentially from an enlargement side toward a reduction side. The aperture diaphragm 41 is set for defining brightness of the projection system 3C.

The first lens group 31 includes a first sub-lens group 33 having negative power and a second sub-lens group 34 having positive power sequentially from the enlargement side toward the reduction side.

The first sub-lens group 33 includes two lenses L1 and L2. The lens L1 and the lens L2 are placed sequentially from the enlargement side toward the reduction side.

The lens L1 (enlargement-side lens) has negative power. The lens L1 has a concave shape near the optical axis N and a convex shape in the peripheral portion in the surface at the enlargement side. The lens L1 has a convex shape near the optical axis N and a concave shape in the peripheral portion in the surface at the reduction side. The lens L1 has aspheric shapes in both surfaces. The lens L2 has negative power. The lens L2 is a meniscus lens. The lens L2 has a convex shape in the surface at the enlargement side and a concave shape in the surface at the reduction side.

The second sub-lens group 34 includes a single lens L3. The lens L3 has positive power. The lens L3 has convex shapes in the surfaces at the enlargement side and the reduction side.

The second lens group 32 includes six lenses L4 to L10. The lens L4 to lens L10 are sequentially placed from the enlargement side toward the reduction side.

The lens L4 has negative power. The lens L4 is a meniscus lens. The lens L4 has a concave shape in the surface at the enlargement side and a convex shape in the surface at the reduction side. The lens L4 has aspheric shapes in both surfaces.

The lens L5 (first lens), the lens L6 (second lens), and the lens L7 (third lens) form a cemented lens L21. The lens L5 has negative power. The lens L5 is a meniscus lens. The lens L5 has a convex shape in the surface at the enlargement side and a concave shape in the surface at the reduction side. The lens L6 has positive power. The lens L6 has convex shapes in the surfaces at the enlargement side and the reduction side. The lens L7 has negative power. The lens L7 has concave shapes in the surfaces at the enlargement side and the reduction side. The cemented lens L21 has negative power.

The lens L8 has positive power. The lens L8 has a convex shape in the surface at the enlargement side. The lens L8 has a convex shape near the optical axis N and has a concave shape in the peripheral portion in the surface at the reduction side. The lens L8 has aspheric shapes in both surfaces.

The lens L9 has positive power. The lens L9 has convex shapes in the surfaces at the enlargement side and the reduction side. The lens L10 (reduction-side lens) has positive power. The lens L10 has a concave shape in the surface at the enlargement side and has a convex shape in the surface at the reduction side. The lens L10 has aspheric shapes in both surfaces.

The lens L1 is made of resin. The lens L2 to lens L10 are made of glass.

In the projection system 3C, the reduction side of the lens L10 is telecentric.

Between the lens L2 located at the most reduction side of the first sub-lens group 33 and the lens L3 located at the most enlargement side of the second sub-lens group 34, a first air gap G1 wider than air gaps between the other lenses adjacent to each other is provided.

When the F-number of the projection system 3C is FNo, the total track length is TTL, the distance on the optical axis N from the surface at the enlargement side of the lens L1 to the surface at the reduction side of the lens L10 is L, the back focus is BF, the maximum half angle of view of the entire lens system is ω, the distance from the optical axis N to the maximum image height of the projection image formed by the liquid crystal panel 18 is YIM, the focal length of the entire lens system is F, the power of the entire lens system is P, the focal length of the lens L1 is Fls, the focal length of the lens L10 is Flf, the power of the lens L5 in the air is Pc1, the Abbe's number of the lens L5 is Vc1, the power of the lens L6 in the air is Pc2, the Abbe's number of the lens L6 is Vc2, the power of the lens L7 in the air is Pc3, the Abbe's number of the lens L7 is Vc3, and the focal length of the lens L3 is Flp, data of the projection system 3C of Example 3 is as below.

| | |
|---|---|
| Fno | 2.007 |
| TTL | 94.125 mm |
| L | 65.000 mm |
| BF | 29.125 mm |
| ω | 51.604° |
| YIM | 10.350 mm |
| F | 8.308 mm |
| P | 0.120 |
| Fls | −40.781 mm |
| Flf | 239.200 mm |
| Pc1 | −0.032 |
| Vc1 | 38.027 |
| Pc2 | 0.083 |
| Vc2 | 81.546 |
| Pc3 | −0.100 |
| Vc3 | 31.343 |
| Flp | 30.030 mm |

Lens data of the projection system 3C is as below. The surface numbers are sequentially assigned from the enlargement side toward the reduction side. The signs are signs of the screen, the lens, the aperture diaphragm, the dichroic prism, and the liquid crystal panel. The surface with * attached to the surface number is an aspheric surface. R is a radius of curvature. D is an axial surface distance. nd is a refractive index of d ray. vd is an Abbe's number of d ray. The units of R, d are mm.

| Sign | Surface number | R | D | nd | vd |
|---|---|---|---|---|---|
| S | 0 | inf | 797.472 | | |
| L01 | 1* | −13.02 | 2.072 | 1.5365 | 56.0 |
| | 2* | −33.75 | 4.102 | | |
| L02 | 3 | 68.89 | 1.500 | 1.8348 | 42.7 |
| | 4 | 12.07 | 19.186 | | |
| L03 | 5 | 47.56 | 3.786 | 1.8697 | 20.0 |
| | 6 | −57.07 | 0.500 | | |
| 41 | 7 | inf | 0.885 | | |
| L04 | 8* | −916.94 | 2.000 | 1.5163 | 64.1 |
| | 9* | −272.61 | 5.811 | | |
| L05 | 10 | 24.20 | 1.242 | 1.6034 | 38.0 |
| L06 | 11 | 10.47 | 7.998 | 1.4970 | 81.5 |
| L07 | 12 | −10.51 | 1.200 | 1.9037 | 31.3 |
| | 13 | 72.70 | 0.348 | | |
| L08 | 14* | 328.27 | 2.929 | 1.5365 | 56.0 |
| | 15* | −19.18 | 0.200 | | |
| L09 | 16 | 53.28 | 8.705 | 1.4970 | 81.5 |
| | 17 | −14.52 | 0.200 | | |
| L10 | 18* | −11.86 | 2.336 | 1.5365 | 56.0 |
| | 19* | −11.61 | 0.20 | | |
| 19 | 20 | inf | 23.93 | 1.5168 | 64.2 |
| | 21 | inf | 5.03 | | |
| 18 | 22 | inf | −0.03 | | |

The respective aspheric factors are as below.

| | Surface number | |
|---|---|---|
| | 1 | 2 |
| Conic constant | −2.15602E+00 | −1.00000E+02 |
| Third-order factor | 6.40257E−04 | 7.74472E−04 |
| Fourth-order factor | 1.11405E−03 | 6.53746E−04 |
| Fifth-order factor | −1.28849E−04 | −6.97719E−05 |
| Sixth-order factor | 3.26299E−06 | 8.27625E−06 |
| Seventh-order factor | 2.08804E−07 | −4.90677E−07 |
| Eighth-order factor | −2.84616E−09 | −5.37025E−08 |
| Ninth-order factor | −5.29625E−10 | 1.92986E−09 |
| 10th-order factor | −1.35786E−11 | 5.52705E−10 |
| 11th-order factor | 3.44014E−13 | 9.63839E−12 |
| 12th-order factor | 6.65677E−14 | −5.44902E−13 |
| 13th-order factor | 4.90515E−15 | −2.07361E−13 |
| 14th-order factor | −1.16959E−16 | −2.78221E−14 |
| 15th-order factor | −1.16608E−17 | −2.17324E−16 |
| 16th-order factor | −4.93436E−19 | 1.54783E−16 |
| 17th-order factor | 6.43046E−21 | 3.06011E−17 |
| 18th-order factor | −1.98650E−21 | −1.06748E−18 |
| 19th-order factor | 4.34294E−22 | −1.85121E−19 |
| 20th-order factor | −1.36475E−23 | 8.10758E−21 |

| | Surface number | | |
|---|---|---|---|
| | 8 | 9 | 14 |
| Conic constant | 0.00000E+00 | 0.00000E+00 | 0.00000E+00 |
| Fourth-order factor | −1.90495E−04 | −2.43398E−04 | 1.29412E−04 |
| Sixth-order factor | 4.33667E−07 | 6.75888E−07 | 1.07961E−06 |
| Eighth-order factor | −1.72697E−08 | −1.99474E−08 | −8.01000E−09 |
| 10th-order factor | 1.48432E−11 | 8.07157E−11 | −2.79684E−11 |
| 12th-order factor | 0.00000E+00 | 0.00000E+00 | 1.14647E−13 |
| 14th-order factor | 0.00000E+00 | 0.00000E+00 | −4.11745E−25 |
| 16th-order factor | 0.00000E+00 | 0.00000E+00 | −1.25432E−26 |

| | Surface number | | |
|---|---|---|---|
| | 15 | 18 | 19 |
| Conic constant | 0.00000E+00 | −1.62095E−01 | −4.85731E−01 |
| Fourth-order factor | 2.55028E−04 | 3.91706E−04 | 2.85197E−04 |
| Sixth-order factor | 2.08912E−06 | −8.81038E−07 | −1.59722E−07 |
| Eighth-order factor | −1.01165E−08 | 1.06482E−09 | −3.51759E−09 |
| 10th-order factor | −1.11638E−10 | −1.08940E−12 | 9.60172E−12 |
| 12th-order factor | 5.55728E−13 | 1.16815E−13 | 7.44323E−14 |
| 14th-order factor | −1.99782E−23 | −5.51265E−16 | −5.92858E−16 |
| 16th-order factor | −1.31283E−26 | 2.70570E−26 | −1.69630E−26 |

Here, the projection system 3C of the example satisfies the following conditional expression (1) when the maximum half angle of view of the entire lens system is ω.

$$\omega > 40 \quad (1)$$

In the example,

ω 51.604°

Therefore, ω=51.604° and satisfies the conditional expression (1).

The projection system 3C of the example satisfies all of the following conditional expressions (2), (3), (4), and (5) when the total length from the lens surface at the enlargement side of the lens L1 to the lens surface at the reduction side of the lens L10 is L, the focal length of the entire lens system is F, the air conversion length of the back focus is BF, the focal length of the lens L1 is Fls, and the focal length of the lens L10 is Flf.

$$5.0 < L/F < 30.0 \quad (2)$$

$$BF/F > 2.0 \quad (3)$$

$$-20.0 < Fls/F < -2.0 \quad (4)$$

$$1.6 < Flf/F < 30.0 \quad (5)$$

In this example,

| | |
|---|---|
| L | 65.000 mm |
| F | 8.308 mm |
| BF | 29.125 mm |
| Fls | −40.781 mm |
| Flf | 239.200 mm |

Therefore, L/F=7.824 and satisfies the conditional expression (2). BF/F=3.506 and satisfies the conditional expression (3). Fls/F=−4.908 and satisfies the conditional expression (4). Flf/F=28.791 and satisfies the conditional expression (5).

The projection system 3C of the example satisfies the following conditional expression (6) when the power of the entire lens system is P, the power of the lens L5 in the air is Pc1, the Abbe's number of the lens L5 is Vc1, the power of the lens L6 in the air is Pc2, the Abbe's number of the lens L6 is Vc2, the power of the lens L7 in the air is Pc3, and the Abbe's number of the lens L7 is Vc3.

$$-0.05<(Pc1/P)/Vc1+(Pc2/P)/Vc2+(Pc3/P)/Vc3<0.01 \quad (6)$$

In the example,

| | |
|---|---|
| P | 0.120 |
| Pc1 | −0.032 |
| Vc1 | 38.027 |
| Pc2 | 0.083 |
| Vc2 | 81.546 |
| Pc3 | −0.100 |
| Vc3 | 31.343 |

Therefore, (Pc1/P)/Vc1+(Pc2/P)/Vc2+(Pc3/P)/Vc3=−0.025 and satisfies the conditional expression (6).

The projection system 3C of the example satisfies the following conditional expressions (7) and (8) when the focal length of the entire lens system is F, the focal length of the lens L3 is Flp, and the Abbe's number of the lens L3 in d ray is vdp.

$$vdp<40 \quad (7)$$

$$1.5<Flp/F<15.0 \quad (8)$$

In the example,

| | |
|---|---|
| vdp | 20.019 |
| F | 8.308 mm |
| Flp | 30.030 mm |

Therefore, vdp=20.019 and satisfies the conditional expression (7). Flp/F=3.615 and satisfies the conditional expression (8).

Functions and Effects

The projection system 3C of the example satisfies the conditional expressions (1) to (8) and the same functions and effects as those of the projection system 3A of Example 1 may be obtained.

In the projection system 3C of the example, the lens L1 has negative power. Therefore, the maximum half angle of view of the projection system 3C is easily increased. In the example, the lens L10 has positive power. Therefore, the reduction side of the second lens group 32 is easily set to be telecentric.

In the example, the first lens group 31 has a plurality of negative lenses placed continuously from the most enlargement side toward the reduction side. In the example, the lens L1 and the lens L2 are negative lenses having negative power. Further, the lens L1 is a plastic aspheric lens. According to the configuration, the curvature of field occurring in the projection system 3C may be suppressed.

Figure 8:
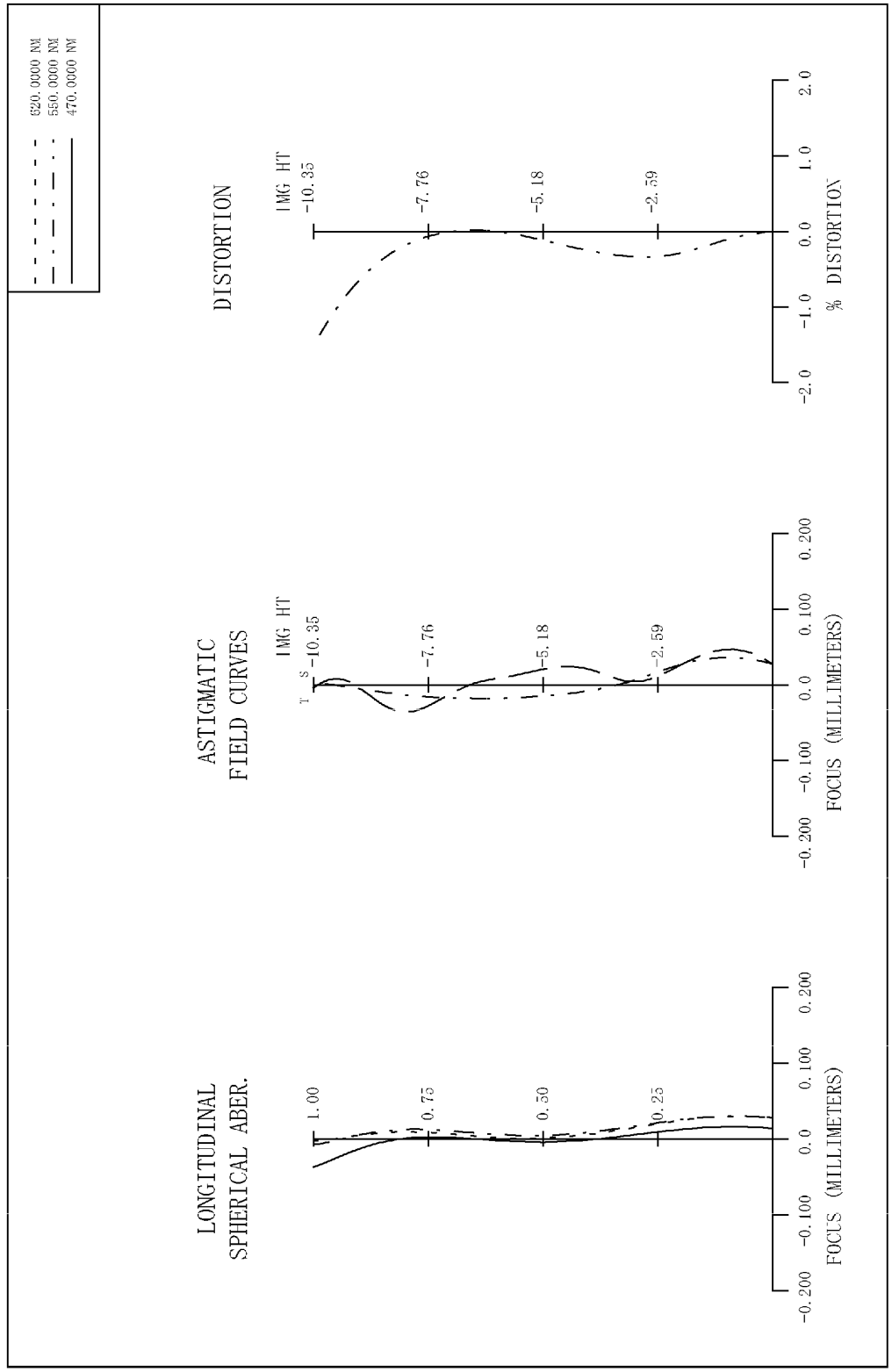
FIG. 8 shows longitudinal aberration, astigmatism, distortion of Example 3.

FIG. 8 shows spherical aberration, astigmatism, distortion of the projection system 3C. As shown in FIG. 8, in the projection system 3C of the example, various kinds of aberration in the enlarged image are suppressed.

Example 4

Figure 9:
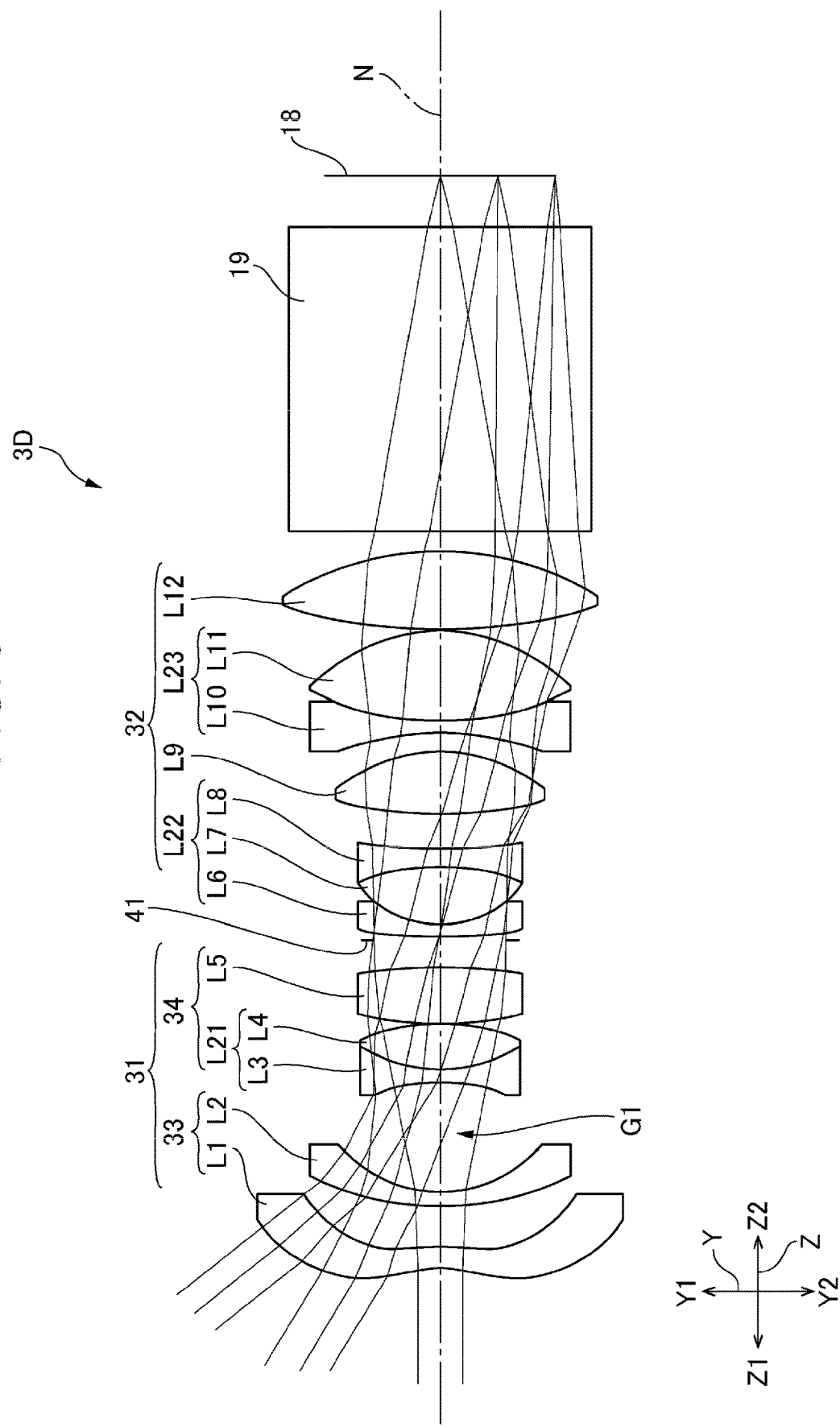
FIG. 9 is a ray diagram of a projection system of Example 4.

FIG. 9 is a ray diagram of a projection system 3D of Example 4. As shown in FIG. 9, the projection system 3D includes a first lens group 31 having positive power, an aperture diaphragm 41, and a second lens group 32 having positive power sequentially from an enlargement side toward a reduction side. The aperture diaphragm 41 is set for defining brightness of the projection system 3D.

The first lens group 31 includes a first sub-lens group 33 having negative power and a second sub-lens group 34 having positive power sequentially from the enlargement side toward the reduction side.

The first sub-lens group 33 includes two lenses L1 and L2. The lens L1 and the lens L2 are placed sequentially from the enlargement side toward the reduction side.

The lens L1 (enlargement-side lens) has negative power. The lens L1 has a concave shape near the optical axis N and a convex shape in the peripheral portion in the surface at the enlargement side. The lens L1 has a convex shape near the optical axis N and a concave shape in the peripheral portion in the surface at the reduction side. The lens L1 has aspheric shapes in both surfaces. The lens L2 has negative power. The lens L2 is a meniscus lens. The lens L2 has a convex shape in the surface at the enlargement side and a concave shape in the surface at the reduction side.

The second sub-lens group 34 includes three lenses L3 to L5. The lens L3 to lens L5 are placed sequentially from the enlargement side toward the reduction side.

The lens L3 and lens L4 form a cemented lens L21. The lens L3 has negative power. The lens L3 has concave shapes in the surfaces at the enlargement side and the reduction side. The lens L4 has positive power. The lens L4 has convex shapes in the surfaces at the enlargement side and the reduction side. The cemented lens L21 has negative power.

The lens L5 has positive power. The lens L5 has convex shapes in the surfaces at the enlargement side and the reduction side.

The second lens group 32 includes seven lenses L6 to L12. The lens L6 to lens L12 are sequentially placed from the enlargement side toward the reduction side.

The lens L6 (first lens), the lens L7 (second lens), and the lens L8 (third lens) form a cemented lens L22. The lens L6 has negative power. The lens L6 is a meniscus lens. The lens L6 has a convex shape in the surface at the enlargement side and a concave shape in the surface at the reduction side. The lens L7 has positive power. The lens L7 has convex shapes in the surfaces at the enlargement side and the reduction side. The lens L8 has negative power. The lens L8 has concave shapes in the surfaces at the enlargement side and the reduction side. The cemented lens L22 has negative power.

The lens L9 has positive power. The lens L9 has convex shapes in the surfaces at the enlargement side and the reduction side. The lens L9 has aspheric shapes in both surfaces.

The lens L10 and the lens L11 form a cemented lens L23. The lens L10 has negative power. The lens L10 has concave shapes in the surfaces at the enlargement side and the reduction side. The lens L11 has positive power. The lens L11 has convex shapes in the surfaces at the enlargement side and the reduction side. The lens L11 has an aspheric shape in the surface at the reduction side. The cemented lens L23 has negative power.

The lens L12 (reduction-side lens) has positive power. The lens L12 has convex shapes in the surfaces at the enlargement side and the reduction side.

The lens L1 is made of resin. The lens L2 to lens L12 are made of glass.

In the projection system 3D, the reduction side of the lens L12 is telecentric.

Between the lens L2 located at the most reduction side of the first sub-lens group 33 and the lens L3 located at the most enlargement side of the second sub-lens group 34, a first air gap G1 wider than air gaps between the other lenses adjacent to each other is provided.

When the F-number of the projection system 3D is FNo, the total track length is TTL, the distance on the optical axis N from the surface at the enlargement side of the lens L1 to the surface at the reduction side of the lens L12 is L, the back focus is BF, the maximum half angle of view of the entire lens system is ω, the distance from the optical axis N to the maximum image height of the projection image formed by the liquid crystal panel 18 is YIM, the focal length of the entire lens system is F, the power of the entire lens system is P, the focal length of the lens L1 is Fls, the focal length of the lens L12 is Flf, the power of the lens L6 in the air is Pc1, the Abbe's number of the lens L6 is Vc1, the power of the lens L7 in the air is Pc2, the Abbe's number of the lens L7 is Vc2, the power of the lens L8 in the air is Pc3, the Abbe's number of the lens L8 is Vc3, and the focal length of the lens L5 is Flp, data of the projection system 3D of Example 4 is as below.

| | |
|---|---|
| Fno | 2.000 |
| TTL | 99.126 mm |
| L | 65.126 mm |
| BF | 34.000 mm |
| ω | 51.275° |
| YIM | 10.350 mm |
| F | 8.350 mm |
| P | 0.120 |
| Fls | −41.126 mm |
| Flf | 36.090 mm |
| Pc1 | −0.082 |
| Vc1 | 31.343 |
| Pc2 | 0.114 |
| Vc2 | 25.683 |
| Pc3 | −0.056 |
| Vc3 | 34.967 |
| Flp | 29.292 mm |

Lens data of the projection system 3D is as below. The surface numbers are sequentially assigned from the enlargement side toward the reduction side. The signs are signs of the screen, the lens, the aperture diaphragm, the dichroic prism, and the liquid crystal panel. The surface with * attached to the surface number is an aspheric surface. R is a radius of curvature. D is an axial surface distance. nd is a refractive index of d ray. vd is an Abbe's number of d ray. The units of R, d are mm.

| Sign | Surface number | R | D | nd | vd |
|---|---|---|---|---|---|
| S | 0 | inf | 730.000 | | |
| L01 | 1* | −8.11 | 2.000 | 1.5311 | 55.8 |
| | 2* | −13.96 | 3.752 | | |
| L02 | 3 | 26.79 | 1.260 | 1.9229 | 20.9 |
| | 4 | 11.79 | 9.960 | | |
| L03 | 5 | −15.33 | 1.200 | 1.7880 | 47.4 |
| L04 | 6 | 13.55 | 4.037 | 1.6477 | 33.8 |
| | 7 | −19.96 | 0.100 | | |
| L05 | 8 | 32.51 | 5.079 | 1.7400 | 28.3 |
| | 9 | −62.10 | 2.508 | | |
| 41 | 10 | inf | 0.298 | | |
| L06 | 11 | 57.34 | 1.000 | 1.9037 | 31.3 |
| L07 | 12 | 9.25 | 5.288 | 1.7847 | 25.7 |
| L08 | 13 | −20.76 | 1.660 | 1.8010 | 35.0 |
| | 14 | 50.00 | 3.098 | | |
| L09 | 15* | 30.63 | 5.775 | 1.4971 | 81.6 |
| | 16* | −13.91 | 1.747 | | |
| L10 | 17 | −26.01 | 1.000 | 2.0006 | 25.5 |
| L11 | 18 | 26.84 | 8.157 | 1.4971 | 81.6 |
| | 19* | −15.77 | 0.10 | | |
| L12 | 20 | 47.56 | 7.11 | 1.4970 | 81.5 |
| | 21 | −27.48 | 2.00 | | |
| 19 | 22 | inf | 27.43 | 1.5168 | 64.2 |
| | 23 | inf | 4.53 | | |
| 18 | 24 | inf | 0.04 | | |

The respective aspheric factors are as below.

| | Surface number | |
|---|---|---|
| | 1 | 2 |
| Conic constant | −3.28760E+00 | −3.50091E−01 |
| Third-order factor | 4.56008E−03 | 4.65351E−03 |
| Fourth-order factor | 2.73066E−04 | 4.31668E−04 |
| Fifth-order factor | −7.71202E−05 | −4.48917E−06 |
| Sixth-order factor | 5.00832E−06 | −4.49202E−06 |
| Seventh-order factor | −7.68562E−08 | 3.25455E−08 |
| Eighth-order factor | −4.02343E−09 | 2.51396E−08 |
| Ninth-order factor | 1.40595E−10 | −1.00330E−10 |
| 10th-order factor | −1.43594E−13 | −5.54462E−11 |

| | Surface number | | |
|---|---|---|---|
| | 15 | 16 | 19 |
| Conic constant | 4.76497E+00 | −2.31470E−01 | −1.72445E+00 |
| Fourth-order factor | −3.03413E−05 | 5.78654E−05 | −4.82060E−05 |
| Sixth-order factor | −9.95954E−08 | −1.32591E−07 | 0.00000E+00 |
| Eighth-order factor | −2.48938E−09 | −2.62097E−09 | 0.00000E+00 |
| 10th-order factor | 2.33921E−11 | 1.18427E−11 | 0.00000E+00 |
| 12th-order factor | −8.97735E−14 | 0.00000E+00 | 0.00000E+00 |

Here, the projection system 3D of the example satisfies the following conditional expression (1) when the maximum half angle of view of the entire lens system is ω.

$$\omega > 40 \quad (1)$$

In the example,
ω 51.275°
Therefore, ω=51.275° and satisfies the conditional expression (1).

The projection system 3D of the example satisfies all of the following conditional expressions (2), (3), (4), and (5) when the total length from the lens surface at the enlargement side of the lens L1 to the lens surface at the reduction side of the lens L12 is L, the focal length of the entire lens system is F, the air conversion length of the back focus is BF, the focal length of the lens L1 is Fls, and the focal length of the lens L12 is Flf.

$$5.0 < L/F < 30.0 \quad (2)$$

$$BF/F > 2.0 \quad (3)$$

$$-20.0 < Fls/F < -2.0 \quad (4)$$

$$1.6 < Flf/F < 30.0 \quad (5)$$

In this example,

| | |
|---|---|
| L | 65.126 mm |
| F | 8.350 mm |
| BF | 34.000 mm |
| Fls | −41.126 mm |
| Flf | 36.090 mm |

Therefore, L/F=7.800 and satisfies the conditional expression (2). BF/F=4.072 and satisfies the conditional expression (3). Fls/F=−4.925 and satisfies the conditional expression (4). Flf/F=4.322 and satisfies the conditional expression (5).

The projection system 3D of the example satisfies the following conditional expression (6) when the power of the entire lens system is P, the power of the lens L6 in the air is Pc1, the Abbe's number of the lens L6 is Vc1, the power of the lens L7 in the air is Pc2, the Abbe's number of the lens L7 is Vc2, the power of the lens L8 in the air is Pc3, and the Abbe's number of the lens L8 is Vc3.

$$-0.05<(Pc1/P)/Vc1+(Pc2/P)/Vc2+(Pc3/P)/Vc3<0.01 \quad (6)$$

In the example,

| | |
|---|---|
| P | 0.120 |
| Pc1 | −0.082 |
| Vc1 | 31.343 |
| Pc2 | 0.114 |
| Vc2 | 25.683 |
| Pc3 | −0.056 |
| Vc3 | 34.967 |

Therefore, (Pc1/P)/Vc1+(Pc2/P)/Vc2+(Pc3/P)/Vc3=0.002 and satisfies the conditional expression (6).

The projection system 3D of the example satisfies the following conditional expressions (7) and (8) when the focal length of the entire lens system is F, the focal length of the lens L5 is Flp, and the Abbe's number of the lens L5 in d ray is vdp.

$$vdp<40 \quad (7)$$

$$1.5<Flp/F<15.0 \quad (8)$$

In the example,

| | |
|---|---|
| vdp | 28.296 |
| F | 8.350 mm |
| Flp | 29.292 mm |

Therefore, vdp=28.296 and satisfies the conditional expression (7). Flp/F=3.508 and satisfies the conditional expression (8).

Functions and Effects

The projection system 3D of the example satisfies the conditional expressions (1) to (8) and the same functions and effects as those of the projection system 3A of Example 1 may be obtained.

In the projection system 3D of the example, the lens L1 has negative power. Therefore, the maximum half angle of view of the projection system 3D is easily increased. In the example, the lens L12 has positive power. Therefore, the reduction side of the second lens group 32 is easily set to be telecentric.

In the example, the first lens group 31 has a plurality of negative lenses placed continuously from the most enlargement side toward the reduction side. In the example, the lens L1 and the lens L2 are negative lenses having negative power. Further, the lens L1 is a plastic aspheric lens. According to the configuration, the curvature of field occurring in the projection system 3D may be suppressed.

Figure 10:
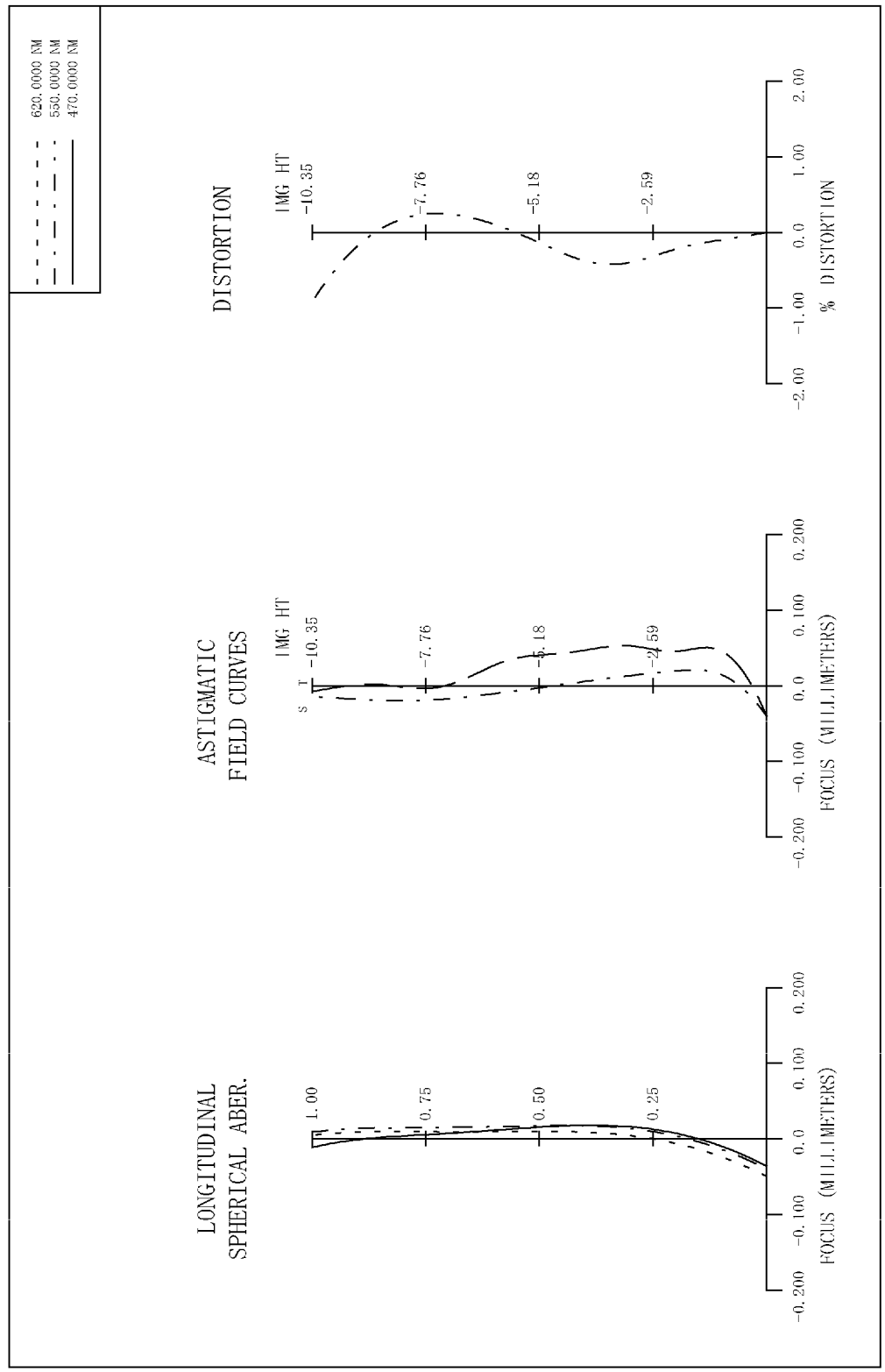
FIG. 10 shows longitudinal aberration, astigmatism, distortion of Example 4.

FIG. 10 shows spherical aberration, astigmatism, distortion of the projection system 3D. As shown in FIG. 10, in the projection system 3D of the example, various kinds of aberration in the enlarged image are suppressed.

Example 5

Figure 11:
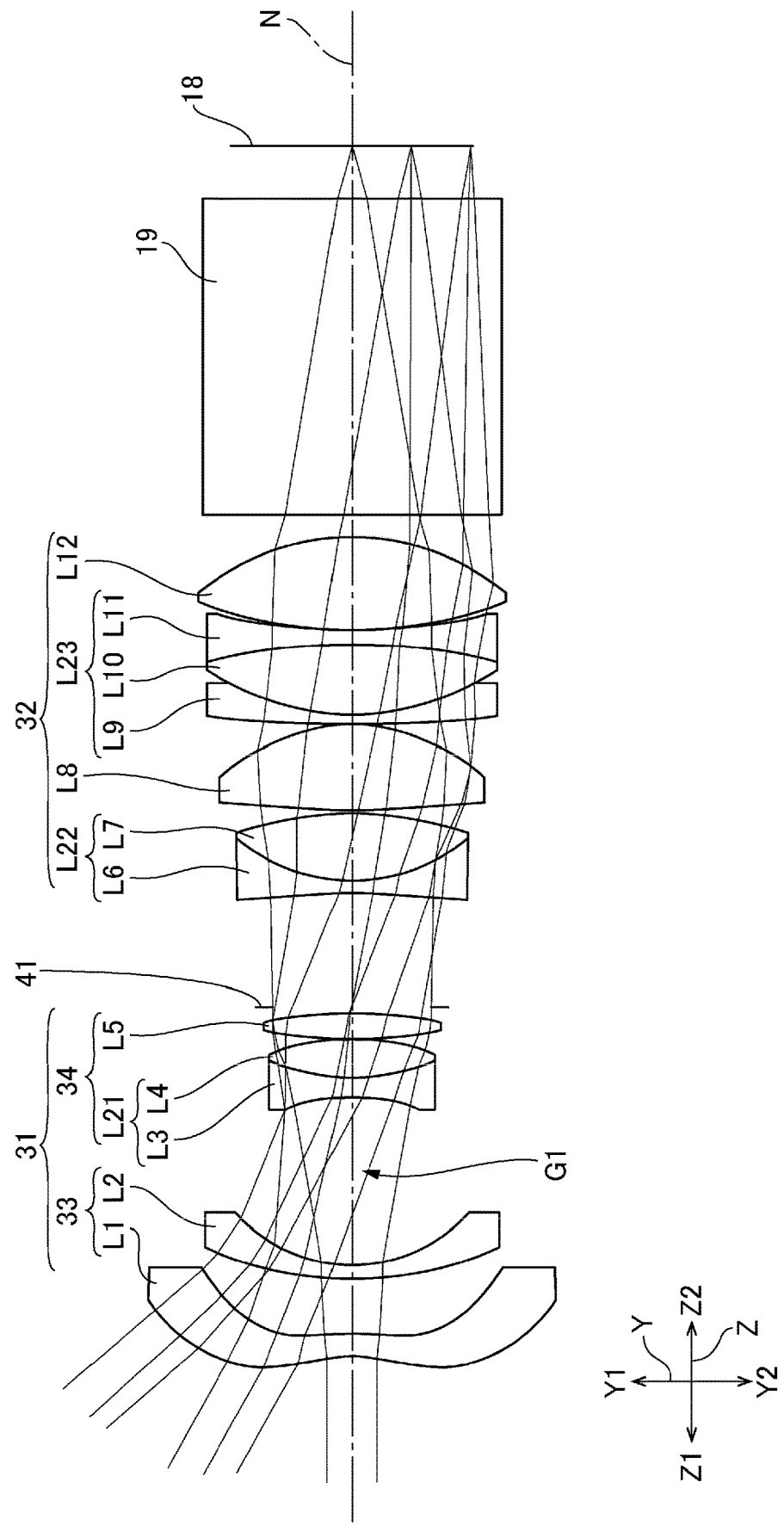
FIG. 11 is a ray diagram of a projection system of Example 5.

FIG. 11 is a ray diagram of a projection system 3E of Example 5. As shown in FIG. 11, the projection system 3E includes a first lens group 31 having positive power, an aperture diaphragm 41, and a second lens group 32 having positive power sequentially from an enlargement side toward a reduction side. The aperture diaphragm 41 is set for defining brightness of the projection system 3E.

The first lens group 31 includes a first sub-lens group 33 having negative power and a second sub-lens group 34 having positive power sequentially from the enlargement side toward the reduction side.

The first sub-lens group 33 includes two lenses L1 and L2. The lens L1 and the lens L2 are placed sequentially from the enlargement side toward the reduction side.

The lens L1 (enlargement-side lens) has negative power. The lens L1 has a concave shape near the optical axis N and a convex shape in the peripheral portion in the surface at the enlargement side. The lens L1 has a convex shape near the optical axis N and a concave shape in the peripheral portion in the surface at the reduction side. The lens L1 has aspheric shapes in both surfaces. The lens L2 has negative power. The lens L2 is a meniscus lens. The lens L2 has a convex shape in the surface at the enlargement side and a concave shape in the surface at the reduction side.

The second sub-lens group 34 includes three lenses L3 to L5. The lens L3 to lens L5 are placed sequentially from the enlargement side toward the reduction side.

The lens L3 and lens L4 form a cemented lens L21. The lens L3 has negative power. The lens L3 has concave shapes in the surfaces at the enlargement side and the reduction side. The lens L4 has positive power. The lens L4 has convex shapes in the surfaces at the enlargement side and the reduction side. The cemented lens L21 has negative power.

The lens L5 has positive power. The lens L5 has convex shapes in the surfaces at the enlargement side and the reduction side.

The second lens group 32 includes seven lenses L6 to L12. The lens L6 to lens L12 are sequentially placed from the enlargement side toward the reduction side.

The lens L6 and the lens L7 form a cemented lens L22. The lens L6 has negative power. The lens L6 has concave shapes in the surfaces at the enlargement side and the reduction side. The lens L7 has positive power. The lens L7 has convex shapes in the surfaces at the enlargement side and the reduction side. The cemented lens L22 has negative power.

The lens L8 has positive power. The lens L8 has convex shapes in the surfaces at the enlargement side and the reduction side. The lens L8 has aspheric shapes in both surfaces.

The lens L9 (first lens), the lens L10 (second lens), and the lens L11 (third lens) form a cemented lens L23. The lens L9 has negative power. The lens L9 is a meniscus lens. The lens L9 has a convex shape in the surface at the enlargement side and a concave shape in the surface at the reduction side. The lens L10 has positive power. The lens L10 has convex shapes in the surfaces at the enlargement side and the reduction side. The lens L11 has negative power. The lens L11 has concave shapes in the surfaces at the enlargement side and the reduction side. The cemented lens L23 has negative power.

The lens L12 (reduction-side lens) has positive power. The lens L12 has convex shapes in the surfaces at the enlargement side and the reduction side.

The lens L1 is made of resin. The lens L2 to lens L12 are made of glass.

In the projection system 3E, the reduction side of the lens L12 is telecentric.

Between the lens L2 located at the most reduction side of the first sub-lens group 33 and the lens L3 located at the most enlargement side of the second sub-lens group 34, a first air gap G1 wider than air gaps between the other lenses adjacent to each other is provided.

When the F-number of the projection system 3E is FNo, the total track length is TTL, the distance on the optical axis N from the surface at the enlargement side of the lens L1 to the surface at the reduction side of the lens L12 is L, the back focus is BF, the maximum half angle of view of the entire lens system is ω, the distance from the optical axis N to the maximum image height of the projection image formed by the liquid crystal panel 18 is YIM, the focal length of the entire lens system is F, the power of the entire lens system is P, the focal length of the lens L1 is Fls, the focal length of the lens L12 is Flf, the power of the lens L9 in the air is Pc1, the Abbe's number of the lens L9 is Vc1, the power of the lens L10 in the air is Pc2, the Abbe's number of the lens L10 is Vc2, the power of the lens L11 in the air is Pc3, the Abbe's number of the lens L11 is Vc3, and the focal length of the lens L5 is Flp, data of the projection system 3E of Example 5 is as below.

| | |
|---|---|
| Fno | 2.000 |
| TTL | 105.407 mm |
| L | 71.407 mm |
| BF | 34.000 mm |
| ω | 49.009° |
| YIM | 10.350 mm |
| F | 9.024 mm |
| P | 0.111 |
| Fls | −43.324 mm |
| Flf | 28.008 mm |
| Pc1 | −0.031 |
| Vc1 | 37.134 |
| Pc2 | 0.030 |
| Vc2 | 70.236 |
| Pc3 | −0.032 |
| Vc3 | 29.845 |
| Flp | 24.232 mm |

Lens data of the projection system 3E is as below. The surface numbers are sequentially assigned from the enlargement side toward the reduction side. The signs are signs of the screen, the lens, the aperture diaphragm, the dichroic prism, and the liquid crystal panel. The surface with * attached to the surface number is an aspheric surface. R is a radius of curvature. D is an axial surface distance. nd is a refractive index of d ray. vd is an Abbe's number of d ray. The units of R, d are mm.

| Sign | Surface number | R | D | nd | vd |
|---|---|---|---|---|---|
| S | 0 | inf | 730.000 | | |
| L01 | 1* | −7.70 | 2.000 | 1.5311 | 55.8 |
| | 2* | −12.59 | 4.818 | | |
| L02 | 3 | 32.02 | 1.200 | 1.9229 | 20.9 |
| | 4 | 13.57 | 14.884 | | |
| L03 | 5 | −15.47 | 1.739 | 1.8919 | 37.1 |
| L04 | 6 | 17.70 | 3.293 | 1.7174 | 29.5 |
| | 7 | −21.04 | 0.100 | | |
| L05 | 8 | 43.84 | 2.132 | 1.8929 | 20.4 |
| | 9 | −42.59 | 0.339 | | |
| 41 | 10 | inf | 9.888 | | |
| L06 | 11 | −64.54 | 1.000 | 1.9037 | 31.3 |
| L07 | 12 | 14.95 | 5.865 | 1.6393 | 44.9 |
| | 13 | −31.43 | 0.348 | | |
| L08 | 14* | 54.90 | 7.333 | 1.4971 | 81.6 |
| | 15* | −15.58 | 0.100 | | |
| L09 | 16 | 125.67 | 1.000 | 1.8919 | 37.1 |
| L10 | 17 | 23.25 | 6.034 | 1.4875 | 70.2 |
| L11 | 18 | −50.00 | 1.200 | 1.8000 | 29.8 |
| | 19 | 50.00 | 0.10 | | |
| L12 | 20 | 38.12 | 8.03 | 1.4970 | 81.5 |
| | 21 | −20.47 | 2.00 | | |
| 19 | 22 | inf | 27.43 | 1.5168 | 64.2 |
| | 23 | inf | 4.53 | | |
| 18 | 24 | inf | 0.05 | | |

The respective aspheric factors are as below.

| | Surface number | |
|---|---|---|
| | 1 | 2 |
| Conic constant | −2.58463E+00 | −3.99724E−01 |
| Third-order factor | 4.82890E−03 | 4.71425E−03 |
| Fourth-order factor | 2.94928E−04 | 3.66704E−04 |
| Fifth-order factor | −7.91955E−05 | 7.64841E−06 |
| Sixth-order factor | 4.92926E−06 | −4.60362E−06 |
| Seventh-order factor | −7.41337E−08 | 2.14709E−09 |
| Eighth-order factor | −3.72649E−09 | 2.37266E−08 |
| Ninth-order factor | 1.47036E−10 | −6.58601E−11 |
| 10th-order factor | −1.17941E−12 | −4.33752E−11 |

| | Surface number | |
|---|---|---|
| | 14 | 15 |
| Conic constant | −4.68097E+00 | 2.17431E−01 |
| Fourth-order factor | −2.96461E−05 | 4.03934E−05 |
| Sixth-order factor | 7.35538E−08 | 5.27088E−08 |
| Eighth-order factor | −6.27185E−10 | −4.59944E−10 |
| 10th-order factor | 2.96982E−13 | 2.19885E−12 |
| 12th-order factor | 1.19210E−14 | 0.00000E+00 |

Here, the projection system 3E of the example satisfies the following conditional expression (1) when the maximum half angle of view of the entire lens system is ω.

$$\omega > 40 \quad (1)$$

In the example,

ω 49.009°

Therefore, ω=49.009° and satisfies the conditional expression (1).

The projection system 3E of the example satisfies all of the following conditional expressions (2), (3), (4), and (5) when the total length from the lens surface at the enlargement side of the lens L1 to the lens surface at the reduction side of the lens L12 is L, the focal length of the entire lens system is F, the air conversion length of the back focus is BF, the focal length of the lens L1 is Fls, and the focal length of the lens L12 is Flf.

$$5.0 < L/F < 30.0 \quad (2)$$

$$BF/F > 2.0 \quad (3)$$

$$-20.0 < Fls/F < -2.0 \quad (4)$$

$$1.6 < Flf/F < 30.0 \quad (5)$$

In the example,

| | |
|---|---|
| L | 71.407 mm |
| F | 9.024 mm |
| BF | 34.000 mm |
| Fls | −43.324 mm |
| Flf | 28.008 mm |

Therefore, L/F=7.913 and satisfies the conditional expression (2). BF/F=3.768 and satisfies the conditional expression (3). Fls/F=−4.801 and satisfies the conditional expression (4). Flf/F=3.104 and satisfies the conditional expression (5).

The projection system 3E of the example satisfies the following conditional expression (6) when the power of the entire lens system is P, the power of the lens L9 in the air is Pc1, the Abbe's number of the lens L9 is Vc1, the power of the lens L10 in the air is Pc2, the Abbe's number of the lens L10 is Vc2, the power of the lens L11 in the air is Pc3, and the Abbe's number of the lens L11 is Vc3.

$$-0.05 < (Pc1/P)/Vc1 + (Pc2/P)/Vc2 + (Pc3/P)/Vc3 < 0.01 \quad (6)$$

In the example,

| | |
|---|---|
| P | 0.111 |
| Pc1 | −0.031 |
| Vc1 | 37.134 |
| Pc2 | 0.030 |
| Vc2 | 70.236 |
| Pc3 | −0.032 |
| Vc3 | 29.845 |

Therefore, (Pc1/P)/Vc1+(Pc2/P)/Vc2+(Pc3/P)/Vc3=−0.014 and satisfies the conditional expression (6).

The projection system 3E of the example satisfies the following conditional expressions (7) and (8) when the focal length of the entire lens system is F, the focal length of the lens L5 is Flp, and the Abbe's number of the lens L5 in d ray is vdp.

$$vdp < 40 \quad (7)$$

$$1.5 < Flp/F < 15.0 \quad (8)$$

In the example,

| | |
|---|---|
| vdp | 20.362 |
| F | 9.024 mm |
| Flp | 24.232 mm |

Therefore, vdp=20.362 and satisfies the conditional expression (7). Flp/F=2.685 and satisfies the conditional expression (8).

Functions and Effects

The projection system 3E of the example satisfies the conditional expressions (1) to (8) and the same functions and effects as those of the projection system 3A of Example 1 may be obtained.

In the projection system 3E of the example, the lens L1 has negative power. Therefore, the maximum half angle of view of the projection system 3E is easily increased. In the example, the lens L12 has positive power. Therefore, the reduction side of the second lens group 32 is easily set to be telecentric.

In the example, the first lens group 31 has a plurality of negative lenses placed continuously from the most enlargement side toward the reduction side. In the example, the lens L1 and the lens L2 are negative lenses having negative power. Further, the lens L1 is a plastic aspheric lens. According to the configuration, the curvature of field occurring in the projection system 3E may be suppressed.

Figure 12:
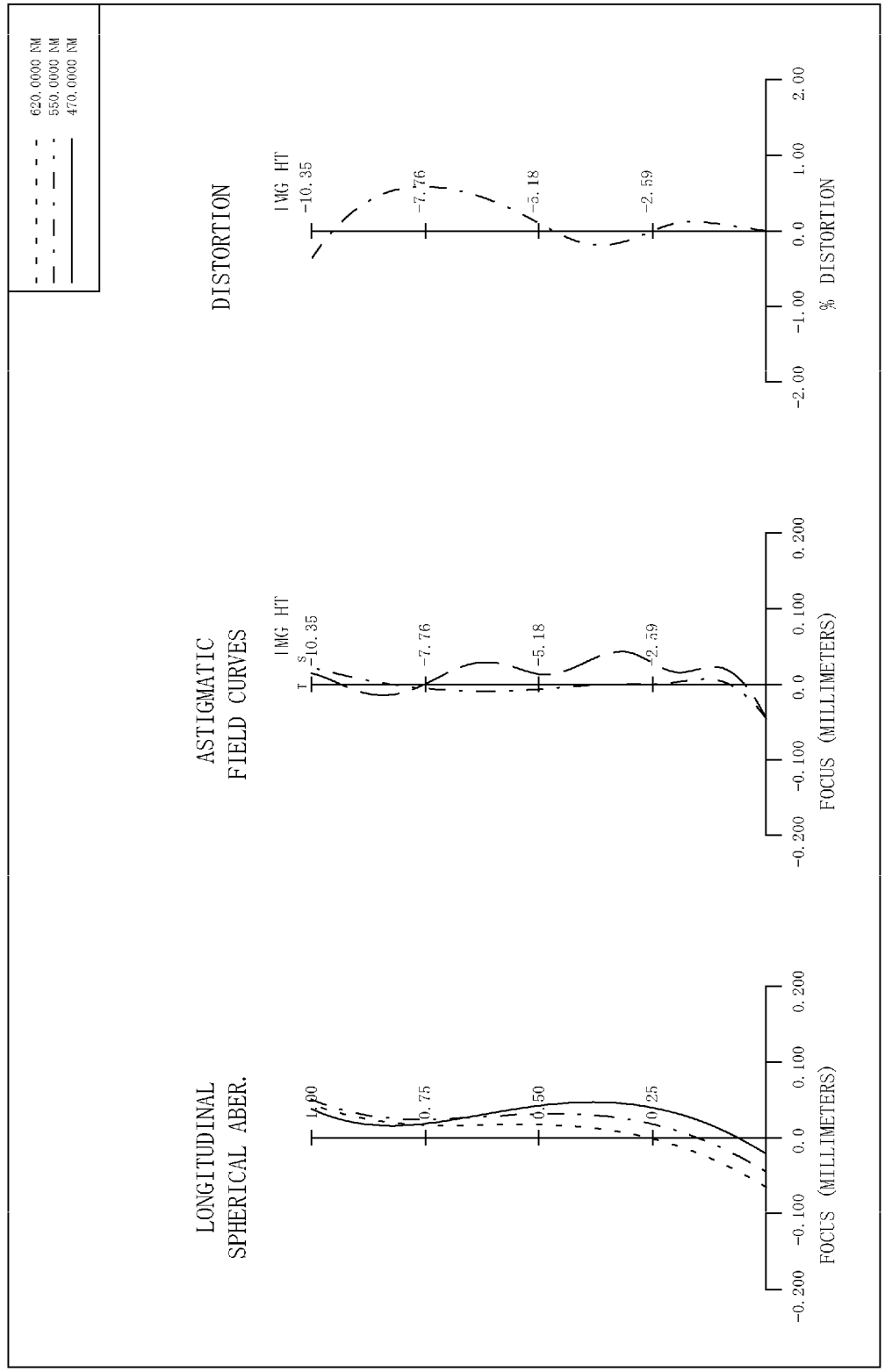
FIG. 12 shows longitudinal aberration, astigmatism, distortion of Example 5.

FIG. 12 shows spherical aberration, astigmatism, distortion of the projection system 3E. As shown in FIG. 12, in the projection system 3E of the example, various kinds of aberration in the enlarged image are suppressed.

Example 6

Figure 13:
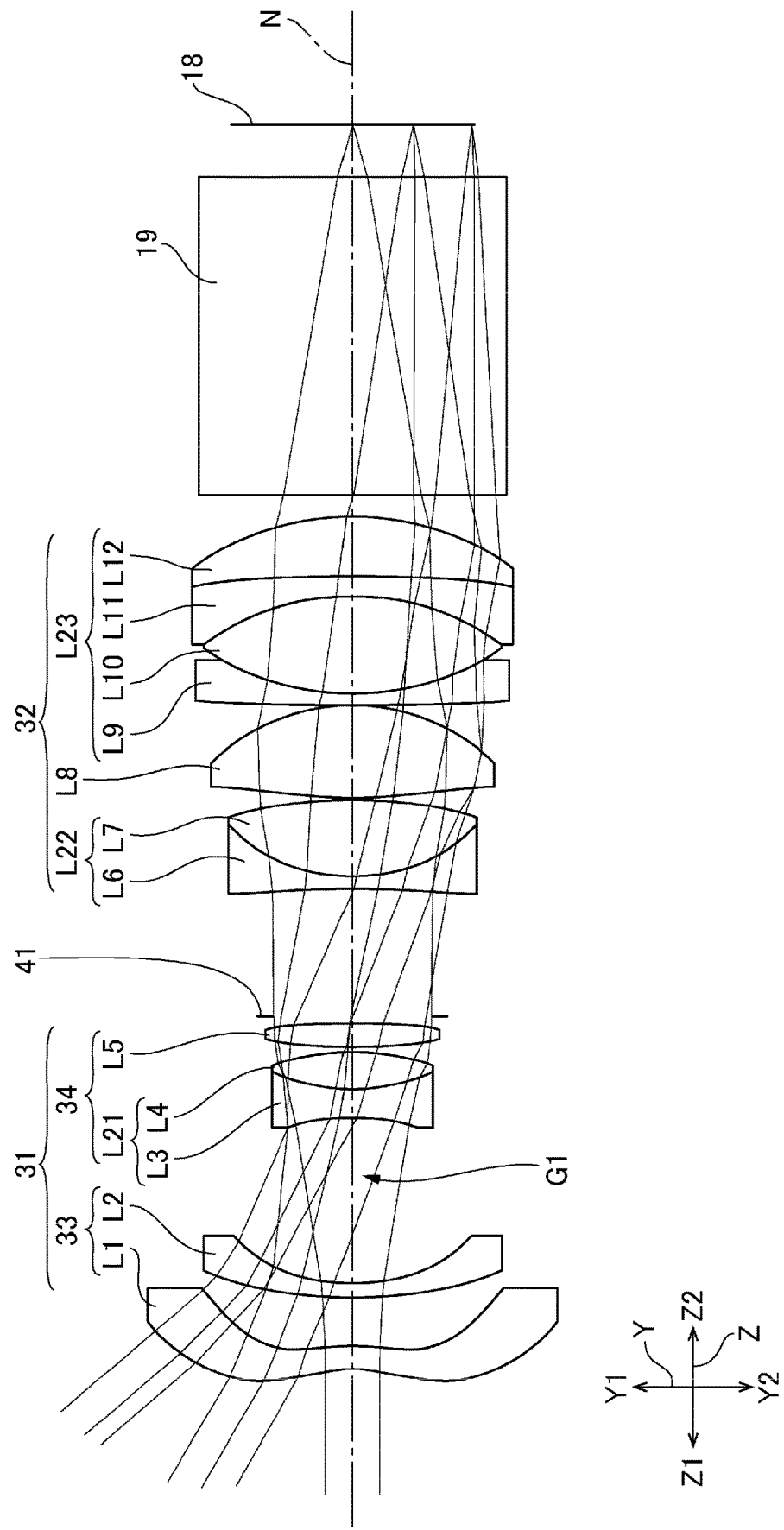
FIG. 13 is a ray diagram of a projection system of Example 6.

FIG. 13 is a ray diagram of a projection system 3F of Example 6. As shown in FIG. 13, the projection system 3F includes a first lens group 31 having positive power, an aperture diaphragm 41, and a second lens group 32 having positive power sequentially from an enlargement side toward a reduction side. The aperture diaphragm 41 is set for defining brightness of the projection system 3F.

The first lens group 31 includes a first sub-lens group 33 having negative power and a second sub-lens group 34 having positive power sequentially from the enlargement side toward the reduction side.

The first sub-lens group 33 includes two lenses L1 and L2. The lens L1 and the lens L2 are placed sequentially from the enlargement side toward the reduction side.

The lens L1 (enlargement-side lens) has negative power. The lens L1 has a concave shape near the optical axis N and a convex shape in the peripheral portion in the surface at the enlargement side. The lens L1 has a concave shape near the optical axis N and a concave shape in the peripheral portion in the surface at the reduction side. The lens L1 has aspheric shapes in both surfaces. The lens L2 has negative power. The lens L2 is a meniscus lens. The lens L2 has a convex shape in the surface at the enlargement side and a concave shape in the surface at the reduction side.

The second sub-lens group 34 includes three lenses L3 to L5. The lens L3 to lens L5 are placed sequentially from the enlargement side toward the reduction side.

The lens L3 and lens L4 form a cemented lens L21. The lens L3 has negative power. The lens L3 has concave shapes in the surfaces at the enlargement side and the reduction side. The lens L4 has positive power. The lens L4 has convex shapes in the surfaces at the enlargement side and the reduction side. The cemented lens L21 has negative power.

The lens L5 has positive power. The lens L5 has convex shapes in the surfaces at the enlargement side and the reduction side.

The second lens group 32 includes seven lenses L6 to L12. The lens L6 to lens L12 are sequentially placed from the enlargement side toward the reduction side.

The lens L6 and the lens L7 form a cemented lens L22. The lens L6 has negative power. The lens L6 has concave shapes in the surfaces at the enlargement side and the reduction side. The lens L7 has positive power. The lens L7 has convex shapes in the surfaces at the enlargement side and the reduction side. The cemented lens L22 has negative power.

The lens L8 has positive power. The lens L8 has convex shapes in the surfaces at the enlargement side and the reduction side. The lens L8 has aspheric shapes in both surfaces.

The lens L9 (first lens), the lens L10 (second lens), the lens L11 (third lens), and the lens L12 (fourth lens, reduction-side lens) form a cemented lens L23. The lens L9 has negative power. The lens L9 is a meniscus lens. The lens L9 has a convex shape in the surface at the enlargement side and a concave shape in the surface at the reduction side. The lens L10 has positive power. The lens L10 has convex shapes in the surfaces at the enlargement side and the reduction side. The lens L11 has negative power. The lens L11 has concave shapes in the surfaces at the enlargement side and the reduction side. The lens L12 has positive power. The lens L12 is a meniscus lens. The lens L12 has a concave shape in the surface at the enlargement side and a convex shape in the surface at the reduction side. The cemented lens L23 has positive power.

The lens L1 is made of resin. The lens L2 to lens L12 are made of glass.

In the projection system 3F, the reduction side of the lens L12 is telecentric.

Between the lens L2 located at the most reduction side of the first sub-lens group 33 and the lens L3 located at the most enlargement side of the second sub-lens group 34, a first air gap G1 wider than air gaps between the other lenses adjacent to each other is provided.

When the F-number of the projection system 3F is FNo, the total track length is TTL, the distance on the optical axis N from the surface at the enlargement side of the lens L1 to the surface at the reduction side of the lens L12 is L, the back focus is BF, the maximum half angle of view of the entire lens system is ω, the distance from the optical axis N to the maximum image height of the projection image formed by the liquid crystal panel 18 is YIM, the focal length of the entire lens system is F, the power of the entire lens system is P, the focal length of the lens L1 is Fls, the focal length of the lens L12 is Flf, the power of the lens L9 in the air is Pc1, the Abbe's number of the lens L9 is Vc1, the power of the lens L10 in the air is Pc2, the Abbe's number of the lens L10 is Vc2, the power of the lens L11 in the air is Pc3, the Abbe's number of the lens L11 is Vc3, and the focal length of the lens L5 is Flp, data of the projection system 3F of Example 6 is as below.

| | |
|---|---|
| Fno | 2.000 |
| TTL | 107.822 mm |
| L | 73.821 mm |
| BF | 34.000 mm |
| ω | 49.024° |
| YIM | 10.350 mm |
| F | 9.024 mm |
| P | 0.111 |
| Fls | −44.333 mm |
| Flf | 43.166 mm |
| Pc1 | −0.036 |
| Vc1 | 37.134 |
| Pc2 | 0.050 |
| Vc2 | 67.736 |
| Pc3 | −0.034 |
| Vc3 | 31.343 |
| Flp | 25.819 mm |

Lens data of the projection system 3F is as below. The surface numbers are sequentially assigned from the enlargement side toward the reduction side. The signs are signs of the screen, the lens, the aperture diaphragm, the dichroic prism, and the liquid crystal panel. The surface with * attached to the surface number is an aspheric surface. R is a radius of curvature. D is an axial surface distance. nd is a refractive index of d ray. vd is an Abbe's number of d ray. The units of R, d are mm.

| Sign | Surface number | R | D | nd | vd |
|---|---|---|---|---|---|
| S | 0 | inf | 730.000 | | |
| L01 | 1* | −7.50 | 2.000 | 1.5311 | 55.8 |
| | 2* | −12.00 | 4.154 | | |
| L02 | 3 | 36.49 | 1.200 | 1.9229 | 20.9 |
| | 4 | 14.69 | 14.756 | | |
| L03 | 5 | −17.02 | 2.500 | 1.8919 | 37.1 |
| L04 | 6 | 17.87 | 3.093 | 1.7174 | 29.5 |
| | 7 | −22.20 | 0.456 | | |
| L05 | 8 | 40.44 | 2.018 | 1.8929 | 20.4 |
| | 9 | −53.61 | 0.328 | | |
| 41 | 10 | inf | 11.124 | | |
| L06 | 11 | −84.03 | 1.000 | 1.9037 | 31.3 |
| L07 | 12 | 14.48 | 6.658 | 1.6393 | 44.9 |
| | 13 | −40.40 | 0.200 | | |
| L08 | 14* | 44.13 | 7.962 | 1.4971 | 81.6 |
| | 15* | −16.01 | 0.100 | | |
| L09 | 16 | 339.16 | 1.000 | 1.8919 | 37.1 |
| L10 | 17 | 22.96 | 8.362 | 1.5952 | 37.7 |
| L11 | 18 | −21.51 | 1.739 | 1.9037 | 31.3 |
| L12 | 19 | −119.37 | 5.172 | 1.6400 | 60.08 |
| | 20 | −22.88 | 2.000 | | |
| 19 | 21 | inf | 27.425 | 1.5168 | 64.2 |
| | 22 | inf | 4.525 | | |
| 18 | 23 | inf | 0.050 | | |

The respective aspheric factors are as below.

| | Surface number | |
|---|---|---|
| | 1 | 2 |
| Conic constant | −2.55589E+00 | −5.38855E−01 |
| Third-order factor | 4.81457E−03 | 4.75038E−03 |
| Fourth-order factor | 2.99026E−04 | 3.70291E−04 |
| Fifth-order factor | −7.96300E−05 | 6.96633E−06 |
| Sixth-order factor | 4.92336E−06 | −4.64326E−06 |
| Seventh-order factor | −7.37902E−08 | −9.43588E−10 |
| Eighth-order factor | −3.70464E−09 | 2.35545E−08 |
| Ninth-order factor | 1.47866E−10 | −6.84558E−11 |
| 10th-order factor | −1.24656E−12 | −4.27212E−11 |

| | Surface number | |
|---|---|---|
| | 14 | 15 |
| Conic constant | 1.01712E+00 | 2.16921E−01 |
| Fourth-order factor | −2.56806E−05 | 3.83240E−05 |
| Sixth-order factor | 7.62347E−08 | 7.17844E−08 |
| Eighth-order factor | −4.35874E−10 | −3.80479E−10 |
| 10th-order factor | 6.31496E−13 | 1.86295E−12 |
| 12th-order factor | 4.41245E−16 | 0.00000E+00 |

Here, the projection system 3F of the example satisfies the following conditional expression (1) when the maximum half angle of view of the entire lens system is ω.

$$\omega > 40 \quad (1)$$

In the example,

ω 49.024°

Therefore, ω=49.024° and satisfies the conditional expression (1).

The projection system 3F of the example satisfies all of the following conditional expressions (2), (3), (4), and (5) when the total length from the lens surface at the enlargement side of the lens L1 to the lens surface at the reduction side of the lens L12 is L, the focal length of the entire lens system is F, the air conversion length of the back focus is BF, the focal length of the lens L1 is Fls, and the focal length of the lens L12 is Flf.

$$5.0<L/F<30.0 \quad (2)$$

$$BF/F>2.0 \quad (3)$$

$$-20.0<Fls/F<-2.0 \quad (4)$$

$$1.6<Flf/F<30.0 \quad (5)$$

In the example,

| | |
|---|---|
| L | 73.821 mm |
| F | 9.024 mm |
| BF | 34.000 mm |
| Fls | −44.333 mm |
| Flf | 43.166 mm |

Therefore, L/F=8.180 and satisfies the conditional expression (2). BF/F=3.768 and satisfies the conditional expression (3). Fls/F=−4.913 and satisfies the conditional expression (4). Flf/F=4.783 and satisfies the conditional expression (5).

The projection system 3F of the example satisfies the following conditional expression (6) when the power of the entire lens system is P, the power of the lens L9 in the air is Pc1, the Abbe's number of the lens L9 is Vc1, the power of the lens L10 in the air is Pc2, the Abbe's number of the lens L10 is Vc2, the power of the lens L11 in the air is Pc3, and the Abbe's number of the lens L11 is Vc3.

$$-0.05<(Pc1/P)/Vc1+(Pc2/P)/Vc2+(Pc3/P)/Vc3<0.01 \quad (6)$$

In the example,

| | |
|---|---|
| P | 0.111 |
| Pc1 | −0.036 |
| Vc1 | 37.134 |
| Pc2 | 0.050 |
| Vc2 | 67.736 |
| Pc3 | −0.034 |
| Vc3 | 31.343 |

Therefore, (Pc1/P)/Vc1+(Pc2/P)/Vc2+(Pc3/P)/Vc3=−0.012 and satisfies the conditional expression (6).

The projection system 3F of the example satisfies the following conditional expressions (7) and (8) when the focal length of the entire lens system is F, the focal length of the lens L5 is Flp, and the Abbe's number of the lens L5 in d ray is vdp.

$$vdp<40 \quad (7)$$

$$1.5<Flp/F<15.0 \quad (8)$$

In the example,

| | |
|---|---|
| vdp | 20.362 |
| F | 9.024 mm |
| Flp | 25.819 mm |

Therefore, vdp=20.362 and satisfies the conditional expression (7). Flp/F=2.861 and satisfies the conditional expression (8).

Functions and Effects

The projection system 3F of the example satisfies the conditional expressions (1) to (8) and the same functions and effects as those of the projection system 3A of Example 1 may be obtained.

In the projection system 3F of the example, the lens L1 has negative power. Therefore, the maximum half angle of view of the projection system 3F is easily increased. In the example, the lens L12 has positive power. Therefore, the reduction side of the second lens group 32 is easily set to be telecentric.

In the example, the first lens group 31 has a plurality of negative lenses placed continuously from the most enlargement side toward the reduction side. In the example, the lens L1 and the lens L2 are negative lenses having negative power. Further, the lens L1 is a plastic aspheric lens. According to the configuration, the curvature of field occurring in the projection system 3F may be suppressed.

In the example, the cemented lens L23 includes the lens L12 having positive power cemented to the reduction side of the lens L11. Therefore, the chromatic aberration of magnification occurring the second sub-lens group 34 may be suppressed.

Figure 14:
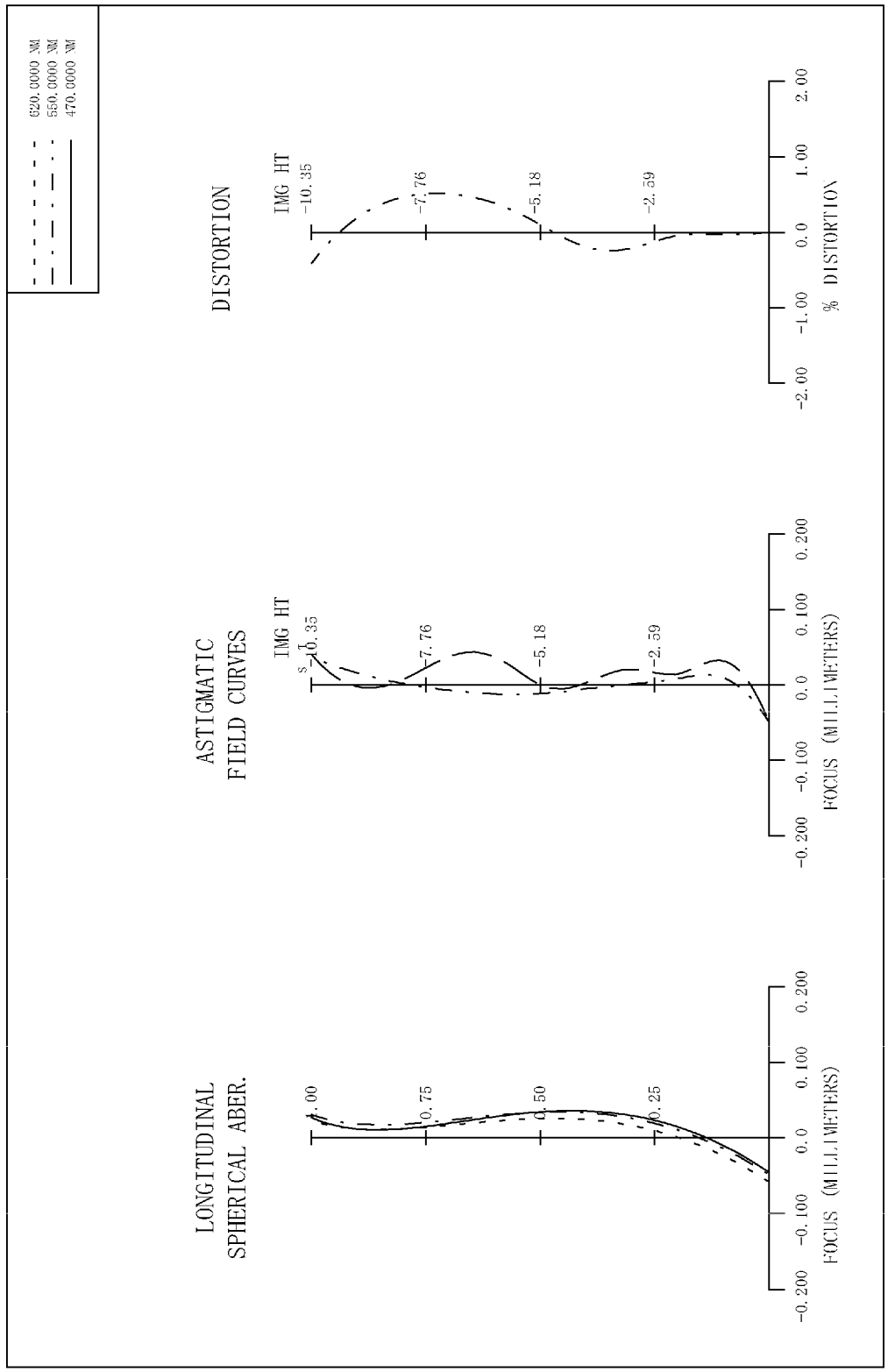
FIG. 14 shows longitudinal aberration, astigmatism, distortion of Example 6.

FIG. 14 shows spherical aberration, astigmatism, distortion of the projection system 3F. As shown in FIG. 14, in the projection system 3F of the example, various kinds of aberration in the enlarged image are suppressed.

Example 7

Figure 15:
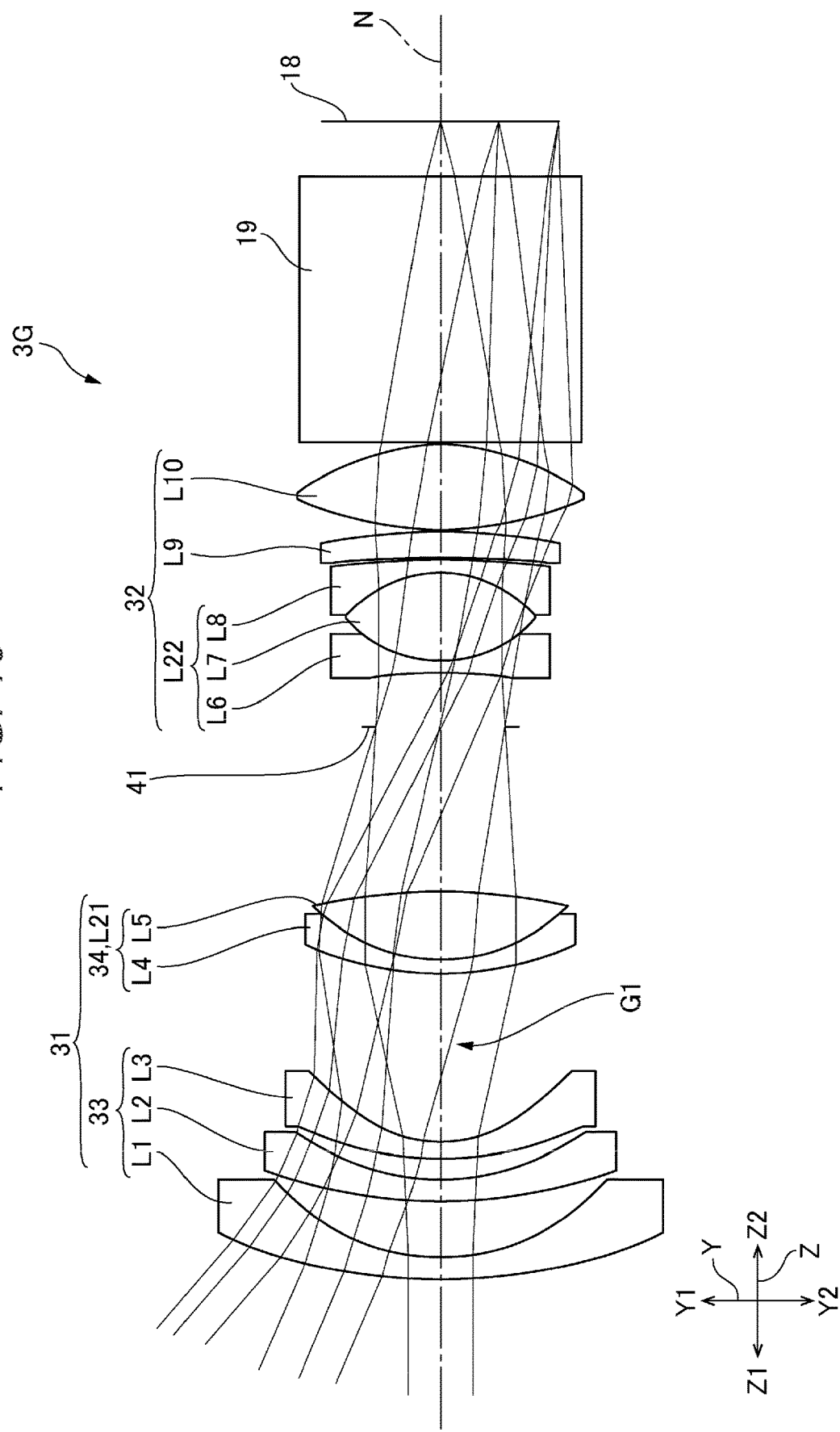
FIG. 15 is a ray diagram of a projection system of Example 7.

FIG. 15 is a ray diagram of a projection system 3G of Example 7. As shown in FIG. 15, the projection system 3G includes a first lens group 31 having positive power, an aperture diaphragm 41, and a second lens group 32 having positive power sequentially from an enlargement side toward a reduction side. The aperture diaphragm 41 is set for defining brightness of the projection system 3G.

The first lens group 31 includes a first sub-lens group 33 having negative power and a second sub-lens group 34 having positive power sequentially from the enlargement side toward the reduction side.

The first sub-lens group 33 includes three lenses L1 to L3. The lens L1 to lens L3 are placed sequentially from the enlargement side toward the reduction side.

The lens L1 (enlargement-side lens) has negative power. The lens L1 is a meniscus lens. The lens L1 has a convex shape in the surface at the enlargement side and a concave shape in the surface at the reduction side. The lens L2 has negative power. The lens L2 is a meniscus lens. The lens L2 has a convex shape in the surface at the enlargement side and a concave shape in the surface at the reduction side. The lens L3 has negative power. The lens L3 is a meniscus lens. The lens L3 has a convex shape in the surface at the enlargement side and a concave shape in the surface at the reduction side. The lens L3 has aspheric shapes in both surfaces.

The second sub-lens group 34 includes two lenses L4 and L5. The lens L4 and the lens L5 are placed sequentially from the enlargement side toward the reduction side.

The lens L4 and lens L5 form a cemented lens L21. The lens L4 has negative power. The lens L4 is a meniscus lens. The lens L4 has a convex shape in the surface at the enlargement side and a concave shape in the surface at the reduction side. The lens L5 has positive power. The lens L5 has convex shapes in the surfaces at the enlargement side and the reduction side. The cemented lens L21 has positive power.

The second lens group 32 includes five lenses L6 to L10. The lens L6 to lens L10 are sequentially placed from the enlargement side toward the reduction side.

The lens L6 (first lens), the lens L7 (second lens), and the lens L8 (third lens) form a cemented lens L22. The lens L6 has negative power. The lens L6 has concave shapes in the surfaces at the enlargement side and the reduction side. The lens L7 has positive power. The lens L7 has convex shapes in the surfaces at the enlargement side and the reduction side. The lens L8 has negative power. The lens L8 is a meniscus lens. The lens L8 has a concave shape in the surface at the enlargement side and a convex shape in the surface at the reduction side. The cemented lens L22 has negative power.

The lens L9 has positive power. The lens L9 is a meniscus lens. The lens L9 has a concave shape in the surface at the enlargement side and a convex shape in the surface at the reduction side.

The lens L10 (reduction-side lens) has positive power. The lens L10 has convex shapes in the surfaces at the enlargement side and the reduction side. The lens L10 has aspheric shapes in both surfaces.

The lens L3 is made of resin. The lens L1, the lens L2, and lens L4 to lens L10 are made of glass.

In the projection system 3G, the reduction side of the lens L10 is telecentric.

Between the lens L3 located at the most reduction side of the first sub-lens group 33 and the lens L4 located at the most enlargement side of the second sub-lens group 34, a first air gap G1 wider than air gaps between the other lenses adjacent to each other is provided.

When the F-number of the projection system 3G is FNo, the total track length is TTL, the distance on the optical axis N from the surface at the enlargement side of the lens L1 to the surface at the reduction side of the lens L10 is L, the back focus is BF, the maximum half angle of view of the entire lens system is ω, the distance from the optical axis N to the maximum image height of the projection image formed by the liquid crystal panel 18 is YIM, the focal length of the entire lens system is F, the power of the entire lens system is P, the focal length of the lens L1 is Fls, the focal length of the lens L10 is Flf, the power of the lens L6 in the air is Pc1, the Abbe's number of the lens L6 is Vc1, the power of the lens L7 in the air is Pc2, the Abbe's number of the lens L7 is Vc2, the power of the lens L8 in the air is Pc3, the Abbe's number of the lens L8 is Vc3, and the focal length of the lens L5 is Flp, data of the projection system 3G of Example 7 is as below.

| | |
|---|---|
| Fno | 2.022 |
| TTL | 104.024 mm |
| L | 75.000 mm |
| BF | 29.024 mm |
| ω | 40.801° |
| YIM | 10.350 mm |
| F | 12.134 mm |
| P | 0.082 |
| Fls | −67.029 mm |
| Flf | 21.642 mm |
| Pc1 | −0.011 |
| Vc1 | 48.841 |
| Pc2 | 0.046 |
| Vc2 | 81.546 |
| Pc3 | −0.051 |
| Vc3 | 33.793 |
| Flp | 15.746 mm |

Lens data of the projection system 3G is as below. The surface numbers are sequentially assigned from the enlargement side toward the reduction side. The signs are signs of the screen, the lens, the aperture diaphragm, the dichroic prism, and the liquid crystal panel. The surface with * attached to the surface number is an aspheric surface. R is a radius of curvature. D is an axial surface distance. nd is a refractive index of d ray. vd is an Abbe's number of d ray. The units of R, d are mm.

| Sign | Surface number | R | D | nd | vd |
|---|---|---|---|---|---|
| S | 0 | inf | 1190.000 | | |
| L01 | 1 | 48.30 | 2.000 | 1.4875 | 70.2 |
| | 2 | 19.26 | 5.054 | | |
| L02 | 3 | 46.84 | 2.000 | 1.5378 | 74.7 |
| | 4 | 21.45 | 1.846 | | |
| L03 | 5* | 73.21 | 1.500 | 1.5365 | 56.0 |
| | 6* | 14.06 | 15.132 | | |
| L04 | 7 | 29.24 | 1.200 | 1.9037 | 31.3 |
| L05 | 8 | 15.81 | 6.000 | 1.8044 | 39.6 |
| | 9 | −54.29 | 14.872 | | |
| 41 | 10 | inf | 4.993 | | |
| L06 | 11 | −48.08 | 1.000 | 1.5317 | 48.8 |
| L07 | 12 | 10.76 | 8.000 | 1.4970 | 81.5 |
| L08 | 13 | −11.07 | 1.200 | 1.6477 | 33.8 |
| | 14 | −83.40 | 0.200 | | |
| L09 | 15 | −85.46 | 2.282 | 1.7200 | 50.2 |
| | 16 | −49.52 | 0.200 | | |
| L10 | 17* | 26.21 | 7.521 | 1.5365 | 56.0 |
| | 18* | −18.88 | 0.200 | | |
| 19 | 19 | inf | 23.93 | 1.5168 | 64.2 |
| | 20 | inf | 4.85 | | |
| 18 | 21 | inf | 0.05 | | |

The respective aspheric factors are as below.

| | Surface number | |
|---|---|---|
| | 5 | 6 |
| Conic constant | 0.00000E+00 | 0.00000E+00 |
| Third-order factor | 1.57900E−03 | 1.85263E−03 |
| Fourth-order factor | 6.96953E−05 | −4.47240E−05 |
| Fifth-order factor | −1.36372E−05 | 1.04252E−06 |
| Sixth-order factor | −3.02221E−07 | −8.19992E−07 |
| Seventh-order factor | 4.84025E−08 | −7.76252E−08 |
| Eighth-order factor | 2.52624E−09 | 1.95332E−09 |
| Ninth-order factor | −2.99137E−10 | 1.09687E−09 |
| 10th-order factor | 6.56267E−12 | −6.17508E−11 |

| | Surface number | |
|---|---|---|
| | 17 | 18 |
| Conic constant | 0.00000E+00 | 0.00000E+00 |
| Fourth-order factor | −2.94834E−05 | 3.01111E−05 |
| Sixth-order factor | 7.70708E−08 | 3.90288E−08 |
| Eighth-order factor | −5.67005E−10 | −4.82412E−10 |
| 10th-order factor | 1.54988E−12 | 1.60978E−12 |

Here, the projection system 3G of the example satisfies the following conditional expression (1) when the maximum half angle of view of the entire lens system is ω.

$$\omega > 40 \tag{1}$$

In the example,
ω 40.801°

Therefore, ω=40.801° and satisfies the conditional expression (1).

The projection system 3G of the example satisfies all of the following conditional expressions (2), (3), (4), and (5) when the total length from the lens surface at the enlargement side of the lens L1 to the lens surface at the reduction side of the lens L10 is L, the focal length of the entire lens system is F, the air conversion length of the back focus is BF, the focal length of the lens L1 is Fls, and the focal length of the lens L10 is Flf.

$$5.0 < L/F < 30.0 \tag{2}$$

$$BF/F > 2.0 \tag{3}$$

$$-20.0<Fls/F<-2.0 \quad (4)$$

$$1.6<Flf/F<30.0 \quad (5)$$

In the example,

| | |
|---|---|
| L | 75.000 mm |
| F | 12.134 mm |
| BF | 29.024 mm |
| Fls | −67.029 mm |
| Flf | 21.642 mm |

Therefore, L/F=6.181 and satisfies the conditional expression (2). BF/F=2.392 and satisfies the conditional expression (3). Fls/F=−5.524 and satisfies the conditional expression (4). Flf/F=1.784 and satisfies the conditional expression (5).

The projection system 3G of the example satisfies the following conditional expression (6) when the power of the entire lens system is P, the power of the lens L6 in the air is Pc1, the Abbe's number of the lens L6 is Vc1, the power of the lens L7 in the air is Pc2, the Abbe's number of the lens L7 is Vc2, the power of the lens L8 in the air is Pc3, and the Abbe's number of the lens L8 is Vc3.

$$-0.05<(Pc1/P)/Vc1+(Pc2/P)/Vc2+(Pc3/P)/Vc3<0.01 \quad (6)$$

In the example,

| | |
|---|---|
| P | 0.082 |
| Pc1 | −0.011 |
| Vc1 | 48.841 |
| Pc2 | 0.046 |
| Vc2 | 81.546 |
| Pc3 | −0.051 |
| Vc3 | 33.793 |

Therefore, (Pc1/P)/Vc1+(Pc2/P)/Vc2+(Pc3/P)/Vc3=−0.014 and satisfies the conditional expression (6).

The projection system 3G of the example satisfies the following conditional expressions (7) and (8) when the focal length of the entire lens system is F, the focal length of the lens L5 is Flp, and the Abbe's number of the lens L5 in d ray is vdp.

$$vdp<40 \quad (7)$$

$$1.5<Flp/F<15.0 \quad (8)$$

In the example,

| | |
|---|---|
| vdp | 39.586 |
| F | 12.134 mm |
| Flp | 15.746 mm |

Therefore, vdp=39.586 and satisfies the conditional expression (7). Flp/F=1.298 and satisfies the conditional expression (8).

Functions and Effects

The projection system 3G of the example satisfies the conditional expressions (1) to (8) and the same functions and effects as those of the projection system 3A of Example 1 may be obtained.

In the projection system 3G of the example, the lens L1 has negative power. Therefore, the maximum half angle of view of the projection system 3G is easily increased. In the example, the lens L10 has positive power. Therefore, the reduction side of the second lens group 32 is easily set to be telecentric.

In the example, the first lens group 31 has a plurality of negative lenses placed continuously from the most enlargement side toward the reduction side. In the example, the lens L1, the lens L2, and the lens L3 are negative lenses having negative power. Further, the lens L3 is a plastic aspheric lens. According to the configuration, the curvature of field occurring in the projection system 3G may be suppressed.

FIG. 16 shows spherical aberration, astigmatism, distortion of the projection system 3G. As shown in FIG. 16, in the projection system 3G of the example, various kinds of aberration in the enlarged image are suppressed.

Other Examples

In the above described examples, one or more lenses are moved along the optical axis N direction in the first lens group 31, and thereby, focusing can be performed. In this case, it is desirable that the cemented lens and the positive lens contained in the first lens group 31 are moved along the optical axis N direction.

As above, the preferred embodiments of the present disclosure are explained, however, the present disclosure is not limited to the above described particular embodiments. Various modifications and changes can be made within the scope of the present disclosure described in What is Claimed is unless not particularly limited in the above description. As an example, the liquid crystal panel 18 is used as the image forming device in the embodiments of the present disclosure, however, the image forming device is not limited to the liquid crystal panel 18, but may be a reflective liquid crystal panel, a DMD (Digital Micromirror Device), or the like.

What is claimed is:

1. A projection system comprising a first lens group having refractive power, an aperture diaphragm, and a second lens group having refractive power sequentially from an enlargement side toward a reduction side, wherein
   a reduction side of the second lens group is telecentric,
   the first lens group includes a first sub-lens group having negative power and a second sub-lens group having positive power sequentially from the enlargement side toward the reduction side,
   an air gap is provided between a lens located at the most reduction side of the first sub-lens group and a lens located at the most enlargement side of the second sub-lens group, the air gap being wider than air gaps between lenses that are other than the lens located at the most reduction side of the first sub-lens group and the lens located at the most enlargement side of the second sub-lens group and that are adjacent to each other,
   a lens located at the most reduction side in the first lens group is a positive lens,
   the second lens group includes a cemented lens,
   the cemented lens includes a first lens having negative power, a second lens having positive power, and a third lens having negative power sequentially from the enlargement side toward the reduction side,

ω>40 where a maximum half angle of view of an entire lens system is @, vdp<40, and 1.5<Flp/F<15.0 where a focal length of the entire lens system is F, a focal length of the positive lens located at the most reduction side in the first lens group is Flp, and an Abbe's number of the positive lens located at the most reduction side in the first lens group in d ray is vdp.

2. The projection system according to claim 1, wherein
an enlargement-side lens located at the most enlargement side in the first lens group has negative power, and
a reduction-side lens located at the most reduction side in the second lens group has positive power.

3. The projection system according to claim 2, wherein
the first lens group has a plurality of negative lenses continuously from the most enlargement side toward the reduction side, and
one negative lens of the plurality of negative lenses is a plastic aspheric lens.

4. The projection system according to claim 3, wherein $5.0 < L/F < 30.0$, $BF/F > 2.0$, $-20.0 < Fls/F < -2.0$, and $1.6 < Flf/F < 30.0$ where a total length from an enlargement-side lens surface of the enlargement-side lens to a reduction-side lens surface of the reduction-side lens is L, a focal length of the entire lens system is F, an air conversion length of a back focus is BF, a focal length of the enlargement-side lens is Fls, and a focal length of the reduction-side lens is Flf.

5. The projection system according to claim 1, wherein $-0.05 < (Pc1/P)/Vc1 + (Pc2/P)/Vc2 + (Pc3/P)/Vc3 < 0.01$ where power of the entire lens system is P, power of the first lens in the air is Pc1, an Abbe's number of the first lens is Vc1, power of the second lens in the air is Pc2, an Abbe's number of the second lens is Vc2, power of the third lens in the air is Pc3, and an Abbe's number of the third lens is Vc3.

6. The projection system according to claim 1, wherein
the cemented lens includes a fourth lens cemented to a reduction side of the third lens, and
the fourth lens has positive power.

7. A projector comprising:
the projection system according to claim 1; and
an image forming device forming a projection image on a conjugate plane at a reduction side of the projection system.

* * * * *